US010136183B2

(12) United States Patent
Cremer et al.

(10) Patent No.: US 10,136,183 B2
(45) Date of Patent: *Nov. 20, 2018

(54) DYNAMIC VIDEO OVERLAYS

(71) Applicant: Gracenote, Inc., Emeryville, CA (US)

(72) Inventors: Markus K. Cremer, Orinda, CA (US); Peter Dunker, El Cerrito, CA (US); Steven D. Scherf, Fremont, CA (US); David Henry Pearce, Kentfield, CA (US); Sherman Ling Fung Li, San Francisco, CA (US); Wilson Harron, Berkeley, CA (US); Konstantinos Antonios Dimitriou, Bavaria (DE); Dewey Ho Lee, Seoul (KR)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,556

(22) Filed: Dec. 16, 2016

(65) Prior Publication Data

US 2017/0180794 A1 Jun. 22, 2017

Related U.S. Application Data

(60) Provisional application No. 62/268,410, filed on Dec. 16, 2015.

(51) Int. Cl.
*H04N 21/44* (2011.01)
*H04N 21/234* (2011.01)
(Continued)

(52) U.S. Cl.
CPC . *H04N 21/44016* (2013.01); *H04N 21/23418* (2013.01); *H04N 21/431* (2013.01);
(Continued)

(58) Field of Classification Search
None
See application file for complete search history.

(56) References Cited

U.S. PATENT DOCUMENTS 5,802,361 A 9/1998 Wang et al.
6,873,341 B1 3/2005 Adams et al.
(Continued)

FOREIGN PATENT DOCUMENTS

EP 0852442 A1 7/1998
WO 2015188670 A1 12/2015

OTHER PUBLICATIONS

International Search Report issued in co-pending International Patent Application No. PCT/US2016/067250, ISA/US, dated May 24, 2017, 5 pages.
(Continued)

*Primary Examiner* — An Son P Huynh
(74) *Attorney, Agent, or Firm* — McDonnell Boehnen Hulbert & Berghoff LLP

(57) ABSTRACT

A client device accesses a video input stream from an intermediate device for display. The client device analyzes the video input stream to determine that the video input stream matches a template indicating a change of content source. The analysis is performed while the client device is generating a video output stream that replaces video content received from a content source via the intermediate device. Based on the video input stream matching the template, the client device ceases replacement of the video input stream. The client device continues to analyze the video input stream and determines that the video input stream matches a second template indicating a return to the original content source. Based on the video input stream matching the second template, the client device resumes replacement of the video input stream.

20 Claims, 17 Drawing Sheets

(51) Int. Cl.
*H04N 21/431* (2011.01)
*H04N 21/433* (2011.01)

(52) U.S. Cl.
CPC ..... *H04N 21/4312* (2013.01); *H04N 21/4314* (2013.01); *H04N 21/4318* (2013.01); *H04N 21/4333* (2013.01); *H04N 21/44008* (2013.01)

(56) References Cited

U.S. PATENT DOCUMENTS

| | | | |
|---|---|---|---|
| 7,814,524 B2 * | 10/2010 | Candelore | H04N 5/44543 715/716 |
| 8,019,162 B2 | 9/2011 | Lhang et al. | |
| 8,175,413 B1 | 5/2012 | Ioffe et al. | |
| 8,606,090 B2 | 12/2013 | Eyer | |
| 9,510,044 B1 | 11/2016 | Pereira et al. | |
| 9,641,870 B1 | 5/2017 | Cormie et al. | |
| 2002/0067678 A1 | 6/2002 | Jeon et al. | |
| 2002/0120931 A1 * | 8/2002 | Huber | H04N 7/17318 725/34 |
| 2002/0126990 A1 * | 9/2002 | Rasmussen | H04N 7/17318 386/240 |
| 2002/0131511 A1 * | 9/2002 | Zenoni | G07C 9/00158 375/240.28 |
| 2002/0133817 A1 | 9/2002 | Markel | |
| 2002/0144262 A1 * | 10/2002 | Plotnick | G11B 27/005 725/32 |
| 2002/0147987 A1 * | 10/2002 | Reynolds | H04N 7/088 725/110 |
| 2002/0174425 A1 * | 11/2002 | Markel | G06Q 30/02 725/13 |
| 2003/0028873 A1 * | 2/2003 | Lemmons | H04N 7/17318 725/36 |
| 2003/0149983 A1 * | 8/2003 | Markel | H04N 7/088 725/51 |
| 2004/0031062 A1 * | 2/2004 | Lemmons | H04N 7/17318 725/136 |
| 2004/0210942 A1 * | 10/2004 | Lemmons | H04N 7/163 725/135 |
| 2004/0240562 A1 | 12/2004 | Bargeron et al. | |
| 2004/0261100 A1 * | 12/2004 | Huber | H04N 7/088 725/32 |
| 2005/0166142 A1 | 7/2005 | Mise et al. | |
| 2006/0085828 A1 * | 4/2006 | Dureau | H04N 5/4401 725/100 |
| 2006/0187358 A1 * | 8/2006 | Lienhart | G06F 17/30802 348/661 |
| 2006/0248569 A1 | 11/2006 | Lienhart et al. | |
| 2006/0265731 A1 * | 11/2006 | Matsuda | G06F 17/3079 725/131 |
| 2007/0104369 A1 | 5/2007 | Weatherhead | |
| 2007/0188655 A1 * | 8/2007 | Ohta | H04N 5/44591 348/389.1 |
| 2007/0192782 A1 | 8/2007 | Ramaswamy | |
| 2007/0256009 A1 | 11/2007 | Jung | |
| 2007/0299853 A1 | 12/2007 | Knotz et al. | |
| 2008/0092168 A1 | 4/2008 | Logan et al. | |
| 2008/0127253 A1 | 5/2008 | Zhang et al. | |
| 2009/0089850 A1 * | 4/2009 | Nakajima | H04N 5/775 725/118 |
| 2009/0123069 A1 | 5/2009 | Deng et al. | |
| 2009/0199230 A1 | 8/2009 | Kumar et al. | |
| 2010/0138863 A1 | 6/2010 | Diaz Perez | |
| 2010/0290705 A1 | 11/2010 | Nakamura | |
| 2010/0318916 A1 | 12/2010 | Wilkins | |
| 2011/0282906 A1 | 11/2011 | Wong | |
| 2011/0300925 A1 | 12/2011 | Adiraju et al. | |
| 2012/0099795 A1 | 4/2012 | Jojic | |
| 2012/0230652 A1 * | 9/2012 | Mirsky | H04N 21/2221 386/241 |
| 2013/0004063 A1 | 1/2013 | Tamura et al. | |
| 2013/0027613 A1 * | 1/2013 | Kim | H04N 21/4126 348/563 |
| 2013/0031582 A1 | 1/2013 | Tinsman et al. | |
| 2013/0036442 A1 * | 2/2013 | Wingert | H04N 21/42209 725/60 |
| 2013/0091515 A1 | 4/2013 | Sakata et al. | |
| 2013/0093786 A1 | 4/2013 | Tanabe et al. | |
| 2013/0132375 A1 | 5/2013 | Jones et al. | |
| 2013/0173765 A1 | 7/2013 | Korbecki | |
| 2013/0212609 A1 | 8/2013 | Sinha et al. | |
| 2013/0215270 A1 | 8/2013 | Murashita | |
| 2013/0227617 A1 | 8/2013 | Carney et al. | |
| 2013/0276033 A1 * | 10/2013 | Francini | H04N 5/44543 725/50 |
| 2014/0245335 A1 | 8/2014 | Holden et al. | |
| 2014/0245354 A1 | 8/2014 | Kunkel et al. | |
| 2014/0282668 A1 * | 9/2014 | Gava | H04N 21/44213 725/19 |
| 2015/0040176 A1 * | 2/2015 | Hybertson | H04N 21/4383 725/131 |
| 2015/0106842 A1 | 4/2015 | Lee | |
| 2015/0221336 A1 | 8/2015 | Deen et al. | |
| 2015/0289002 A1 | 10/2015 | Choi et al. | |
| 2015/0296250 A1 | 10/2015 | Casper | |
| 2016/0094868 A1 | 3/2016 | Singhal et al. | |
| 2016/0189380 A1 | 6/2016 | Li et al. | |
| 2016/0225405 A1 * | 8/2016 | Matias | G11B 27/005 |
| 2016/0366465 A1 | 12/2016 | Kerns et al. | |
| 2017/0094373 A1 | 3/2017 | Downes | |
| 2017/0150213 A1 | 5/2017 | Cremer et al. | |
| 2017/0178373 A1 | 6/2017 | Sarafa et al. | |
| 2017/0180792 A1 | 6/2017 | Cremer et al. | |
| 2017/0180793 A1 | 6/2017 | Cremer et al. | |
| 2017/0180795 A1 | 6/2017 | Cremer et al. | |

OTHER PUBLICATIONS

Written Opinion issued in co-pending International Patent Application No. PCT/US2016/067250, ISA/US, dated May 24, 2017, 13 pages.

* cited by examiner

DYNAMIC VIDEO OVERLAYS

PRIORITY CLAIM

The application claims priority to U.S. Provisional Patent Application No. 62/268,410, filed Dec. 16, 2015, entitled "Dynamic Video Overlays," which is incorporated herein by reference in its entirety.

TECHNICAL FIELD

The subject matter disclosed herein generally relates to the processing of video streams. Specifically, the present disclosure addresses systems and methods to cause the presentation of an overlaid video.

BACKGROUND

Typically, people watch video content, such as television shows, advertisements, movies, video clips, and so on, via devices that receive a transmission from a content source. For example, a broadcaster (e.g., HBO® or CNN®), a web server (e.g., YouTube® peer-to-peer source (e.g., another device), or another content source streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Figure 1:
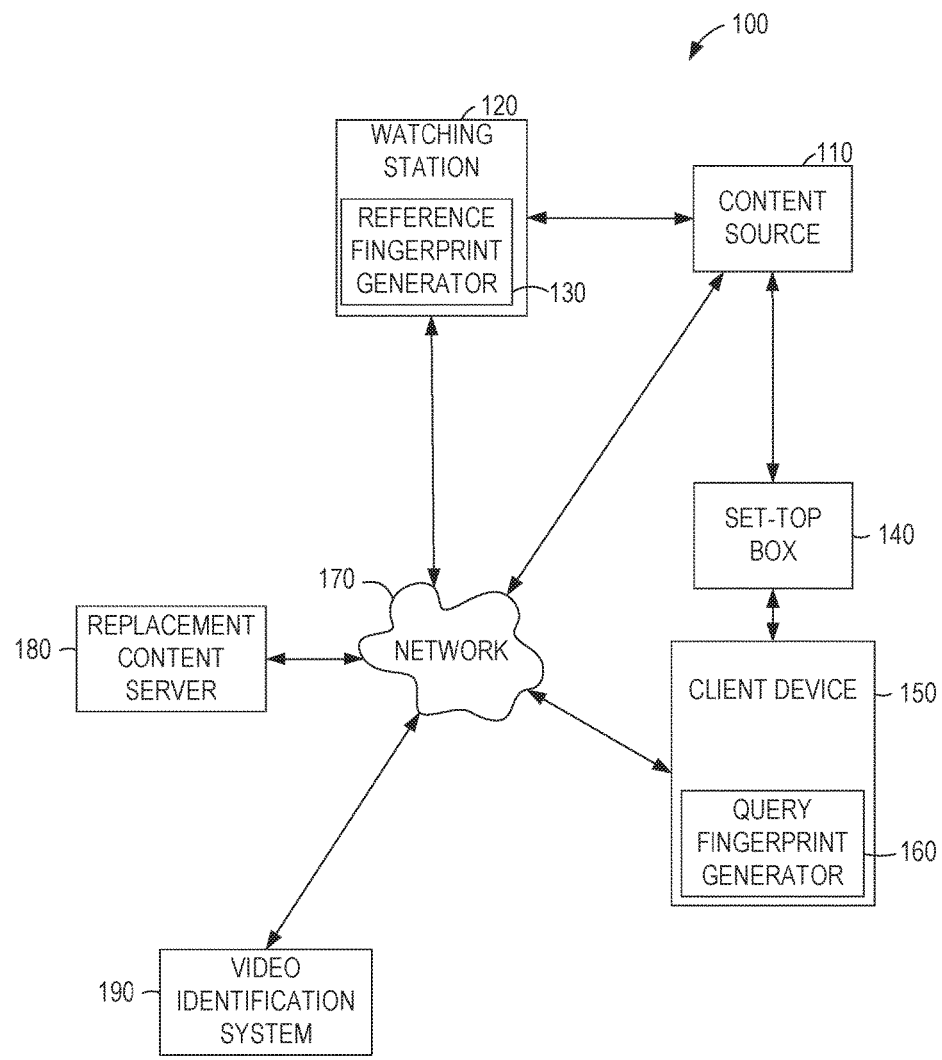
FIG. 1 is a block diagram depicting a network environment, in an example embodiment, for dynamically overlaying video.

Example methods and systems for dynamically providing a video overlay are described. In some example embodiments, a client device (e.g., a smart television (TV)) identifies a set-top box that presents information overlaid on a video stream. Based on the identified set-top box and video data received from the set-top box, a template corresponding to the presented information is selected. Based on the template, a replacement video stream is presented along with the information, mimicking the manner in which the original video stream was presented by the set-top box. In some example embodiments, the replacement video stream is selected based on the original video stream. For example, the client device may generate a query fingerprint of a frame of the original video content. The client device queries a database of known reference fingerprints using the generated query fingerprint, determines that the query fingerprint of the frame of video content matches a known reference fingerprint, and identifies the video content based on the match of fingerprints. Based on the identified video content, the replacement video stream is selected. For example, a replacement video stream showing a particular local commercial may be selected to replace an original video stream showing a particular national commercial.

A fingerprint may be a single-frame fingerprint or a multi-frame fingerprint. A multi-frame fingerprint is a collection of single-frame fingerprints along with the relative timings of the frames. The term "fingerprint" is used to refer to both single-frame and multi-frame fingerprints. The term "component" is used to refer to a single-frame fingerprint within a multi-frame fingerprint, when confusion might otherwise result.

In some example embodiments, the client device presents the replacement video stream at a particular position and size based on the identified template. For example, the set-top box may be presenting the original video stream as a reduced-size picture-in-picture. Accordingly, to mimic the behavior of the set-top box, the replacement video stream is presented at the same size and location as the original video stream.

In further example embodiments, the client device presents a particular portion of the replacement video stream based on the identified template. For example, the set-top box may be presenting the original video stream as a full-screen image, but covering the bottom of the stream with an informational bar. Accordingly, to mimic the behavior of the set-top box, only the top portion of the replacement video stream is presented.

In additional example embodiments, the client device performs an alpha (transparency) blend of a particular portion of the replacement video stream based on the identified template. For example, the set-top box may be presenting a menu superimposed on the original video stream. The client device may extract the menu from the composite image and superimpose the menu on the replacement video stream using an alpha value defined in the template.

In some example embodiments, the client device presents the replacement video stream at a particular speed based on the identified template. For example, the set-top box may be presenting the original video stream in a fast-forward mode. Accordingly, to mimic the behavior of the set-top box, the replacement video stream is presented in a fast-forward mode.

In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for dynamic video overlays, according to some example embodiments. The network environment 100 may include a watching station 120 that receives video and other multimedia content from a content source 110, such as a broadcaster, web server, cable TV station, and so on. For example, the content source 110 may be a broadcaster, such as a TV station or TV network, which streams or transmits media over a TV channel to the watching station 120, and/or a web service, such as a website, that streams or transmits media over a network 170 to the watching station 120, among other things. The watching station 120 includes a reference fingerprint generator 130 that generates reference fingerprints of video content received from the content source 110.

One or more set-top boxes 140 may also receive the video and other multimedia content from the content source 110, such as via a broadcast channel and/or over the network 170. The set-top box 140 may modify the received content before sending content to a client device 150. The client device 150 is any device capable of receiving and presenting a stream of video and/or other multimedia content (e.g., a TV, a second set-top box, a laptop or other personal computer (PC), a tablet or other mobile device, a digital video recorder (DVR), or a gaming device).

In some example embodiments, the set-top box 140 includes a tuner configured to receive an input stream of video content and generate an output stream of video content by processing the input stream. The set-top box 140 may be a device equipped with tuners, decoders and so forth to access video content through a video content distribution network, such as a terrestrial broadcast, cable, and/or satellite broadcast network employed by multichannel video programming distributors. Additionally or alternatively, the set-top box 140 may be a device equipped with network adapters, decoders, and so forth to access video content through a wide area network (e.g., the internet) employed by devices for accessing internet video streaming services. The output stream of video content may be comprised of multiple components. For example, the output stream of video content may include a first component in a first region of the output stream that corresponds to the input stream and a second component in a second region of the output stream that corresponds to video data generated by the set-top box 140. The second component may include a menu for the set-top box 140, an informational message from the set-top box 140, or informational messages generated by other devices (e.g., phones or security alarms) and sent to the set-top box 140 for presentation. The set-top box 140 outputs signals (e.g., digital or analog signals) usable by a display of the client device 150 to present the output video content to a user associated with the client device 150. From the perspective of the client device 150, the signals output by the set-top box 140 are a video input stream.

The client device 150 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on. In some example embodiments, the set-top box 140 and the client device 150 are integrated into a single device.

The network 170 may be any network that enables communication between devices, such as a wired network, a wireless network (e.g., a mobile network), and so on. The network 170 may include one or more portions that constitute a private network (e.g., a cable TV network or a satellite TV network), a public network (e.g., over-the-air broadcast channels or the Internet), and so on.

In some example embodiments, a video identification system 190 communicates with the watching station 120 and the client device 150 over the network 170. The video identification system 190 may receive a query fingerprint generated by a query fingerprint generator 160 of the client device 150, such as a fingerprint of a frame or block of frames within the video content, and query an index of known reference fingerprints generated by the reference fingerprint generator 130 of the watching station 120 in order to identify the video content by matching the query fingerprint with one or more reference fingerprints.

Upon identifying the video content, the video identification system 190 may return an identifier for replacement content (e.g., alternative programming, alternative commercials, and so on) associated with the video content to the client device 150. The replacement content may be stored in a replacement content server 180. Using the identifier, the client device 150 may access the replacement content from the replacement content server 180 and overlay the replacement content with video content received from the set-top box 140. For example, the client device 150 may access and present replacement content from the replacement content server 180, such as a replacement commercial for a broadcast channel.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 16. As used herein, a "database" is a data storage resource and may store data structured as a text file, a table, a spreadsheet, a relational database, a document store, a key-value store, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in FIG. 1. For example, the video identification system 190 may include the query fingerprint generator 160 and frames of video content from the client device 150, and may generate the query fingerprints using the included query fingerprint generator 160, among other configurations.

Figure 2:
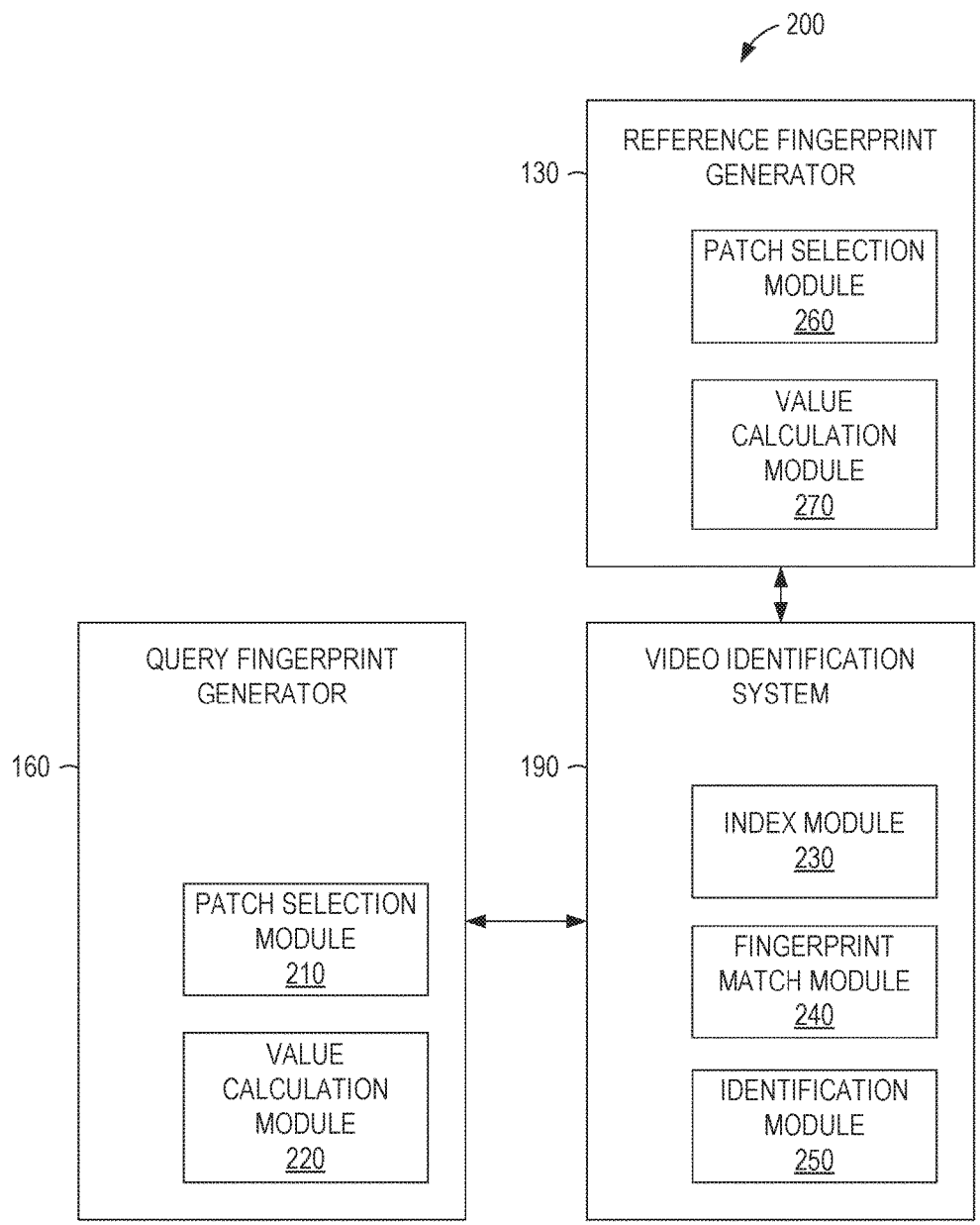
FIG. 2 is a block diagram illustrating components of a video identification system and a query fingerprint generator, according to some example embodiments.

FIG. 2 is a block diagram 200 illustrating components of a query fingerprint generator 160, a reference fingerprint generator 130, and a video identification system 190, according to some example embodiments.

The query fingerprint generator 160 of the client device 150 includes a patch selection module 210 and a value calculation module 220, configured to communicate with each other (e.g., via a bus, shared memory, or a switch). The video identification system 190 includes an index module 230, a fingerprint match module 240, and an identification module 250, all configured to communicate with each other (e.g., via a bus, shared memory, or a switch). The reference fingerprint generator 130 of the watching station 120 includes a patch selection module 260 and a value calculation module 270, configured to communicate with each other (e.g., via a bus, shared memory, or a switch). One or more of the modules described herein may be implemented using hardware (e.g., a processor of a machine, a field-programmable gate array (FPGA), or an application-specific integrated circuit (ASIC)) or a combination of hardware and software (e.g., a processor configured by software). Moreover, any two or more of these modules may be combined into a single module, and the functions described herein for a single module may be subdivided among multiple modules.

In some example embodiments, the query fingerprint generator 160 is configured and/or programmed to generate a query fingerprint of one or more frames of video content captured at the client device 150. For example, the query fingerprint generator 160 may calculate values of patches, such as Haar-like features, regions, portions, and/or other aspects of one or more frames within the video content. For example, a patch may be a portion of a frame having various different geometries, Haar-like features, and so on. In some example embodiments, some or all captured patches may each have a different scale and be at a different location within a frame. By reporting fingerprints for patches of the received video content, the query fingerprint generator 160 may determine the content of each patch. Accordingly, if the video received comprises multiple components from different sources (e.g., an input video stream from a broadcaster and an overlay video stream generated by the set-top box 140), the regions corresponding to the multiple components can be identified.

The query fingerprint generator 160 (and the reference fingerprint generator 130) generates and/or creates fingerprints for identifying video content from frames within the content. Typically, video content received by the client device 150 will be in different formats and sample rates, and the query fingerprint generator 160 creates, for some or all of the frames of the video content, a query fingerprint for each frame that is scale-independent and robust to different compression artifacts. In some example embodiments, the query fingerprint generator 160 may combine the query fingerprints of each of the frames to generate a query fingerprint of a block of frames (e.g., multiple frames) of the video content. The video identification system 190 may respond to video identification requests from millions of query fingerprint generators 160.

The query fingerprint generator 160 may include a patch selection module 210 configured and/or programmed to select multiple patches of the video content, such as patches associated with a displayed region of a frame or frames within the video content. Similarly, the reference fingerprint generator 130 may include a patch selection module 260 configured and/or programmed to select multiple patches of the video content, such as patches associated with a displayed region of a frame or frames within the video content.

Patches may be created by dividing a frame into a grid (for example, a 2×2 grid, a 4×3 grid, or a 4×4 grid). Patches may overlap. For example, 20 patches may be used: four large patches corresponding to the quadrants of a frame and 16 small patches resulting from dividing the frame into a 4×4 grid. As another example, five patches may be used: four large patches corresponding to the quadrants of a frame and a fifth patch of equal size located at the center of the frame. In some examples, patches may be created by dividing a portion of a frame into a grid, such as a central portion of the frame that does not include the outer boundaries of the frame. Thus, the patches may cumulatively span less than the entirety of the frame.

The query fingerprint generator 160 may also include a value calculation module 220 configured or programmed to calculate a value for each of the selected multiple patches using an integral image technique, such as a technique that calculates the values using a summed area table or other data structure that generates a sum of values in a rectangular area of a region. Similarly, the reference fingerprint generator 130 may include a value calculation module 270 configured or programmed to calculate a value for each of the selected multiple patches using an integral image technique, such as a technique that calculates the values using a summed area table or other data structure that generates a sum of values in a rectangular area of a region.

For example, the patch selection module 210, 260 may select patches, such as Haar-like features that are commonly used in object detection, of regions of a frame or frames. The value calculation module 220, 270 may utilize the Haar-like features to generate or calculate a same value for objects in a frame, such as objects in a visual image of a frame, regardless of the relative size of the object. For example, the value calculation module 220, 270 may generate values by approximating Gaussian filters and their derivatives using a box filter (e.g., an average of a region of the frame), wherein derivatives of the Gaussian filters are created by finding the differences in the box filters.

The query fingerprint generator 160, via the value calculation module 220, may generate a query fingerprint by calculating the values of Haar-like features, or patches, at different scales and in different locations of displayed regions of the frames of video content. The reference fingerprint generator 130, via the value calculation module 270, may generate a reference fingerprint by calculating the values of Haar-like features, or patches, at different scales and in different locations of displayed regions of the frames of video content.

In some examples, the patch selection module 210, 260 may select patches that include patches from a grid dividing a region of a frame or frames. The value calculation module 220, 270 may then calculate a characteristic value for each of the patches, such as a summed value of pixel values within each patch, a median value, etc. Moreover, the value calculation module 220, 270 may compute differences between those characteristic values and/or linear combinations of those characteristic values. In some cases, the resulting differences and/or linear combinations may then be used to determine a binary value (e.g., 0 or 1), such as by comparison with a threshold. Thus, the fingerprint generator 160, 130, via the calculation module 220, 260, may generate a fingerprint by calculating binary values that are based on differences and/or linear combinations of characteristic values of multiple patches of the frame or frames of video content.

The video identification system 190 includes the index module 230, the fingerprint match module 240, and the identification module 250, among other modules, which are configured and/or programmed to match a query fingerprint to a known reference fingerprint.

In some example embodiments, the index module 230 is configured and/or programmed to query a database of known reference fingerprints of video content captured at a reference device, such as the watching station 120. For example, the index module 230 may query an index stored within a database of the watching station 120, an index stored within the video identification system 190, and so on.

For example, the index module 230 may be configured to query an index of quantized patch values of the known reference fingerprints. The index module 230 may query an index of 1-, 8-, and/or 24-bit numbers that are associated with single frames of the reference fingerprints. The index module 230 may derive the numbers by quantizing one or more patch values of the reference fingerprints. For example, the index module 230 may normalize fingerprint values by their absolute sum, by log normalization, and so on.

The index module 230 may index some or all frames of the reference fingerprints using the best or better correlated values of large regions of the frames. The index module 230 may create an index using highly correlated values of the full frame patches, because the features associated with the best correlated values may represent the remaining patches of a frame, among other things. The highly correlated values may be pre-determined using a sample data set.

For example, when three regions of a frame are the best correlated values, the index module 230 quantizes each of the three values to 8-bits, such as by placing them in an evenly spaced histogram with a maximum and minimum limit, thereby creating a 24-bit number. The index module 230 may then utilize a reference fingerprint index of 24-bit numbers to quickly look up and/or identify frames. In some example embodiments, a fuzzy search is performed. The fuzzy search can find matches that are inexact. For example, a fuzzy match for the three 8-bit values may be found when the matching values match exactly or are within one of the corresponding value. In this example, there are 27 permutations per index to parse when attempting to match fingerprints, with three matching values for each of the three bytes. Similarly, when four 8-bit values are used with a fuzzy match of the same degree (i.e., with a maximum distance of 1 per value), there are 81 permutations per index. Larger degrees and/or more values increase the number of possible permutations.

As another example, the index module 230 may quantize each of the three values to 1-bit, such as by comparing each value to a threshold, thereby generating a 3-bit number. The index module 230 may then utilize a reference fingerprint index of 3-bit numbers to quickly look up and/or identify frames, because there are only 8 values per index to compare when attempting to match fingerprints.

In another example embodiment, 32 regions are used and each region is represented by a single bit. The 32-bit value may be hashed to generate a key. For example, if 256 hash values are used, the top 8 bits of the 32-bit value may be used as the hash. To look up the fingerprint, potentially matching fingerprints with the same hash value are iterated over and compared.

In some example embodiments, the fingerprint match module 240 is configured and/or programmed to determine that a query fingerprint matches at least one known reference fingerprint. For example, the fingerprint match module 240 may determine that a query fingerprint matches at least one known reference fingerprint by determining that a similarity between the query fingerprint and at least one of the known reference fingerprints satisfies a predetermined threshold associated with a Tanimoto distance measurement, a Manhattan distance measurement, and/or other distance measurements associated with matching images or other visual-based content.

For example, the fingerprint match module 240 may compare a query fingerprint to one or more reference fingerprints using the Tanimoto or the Manhattan distance measurements, and determine that the fingerprints match when the comparison indicates that the distance measurement satisfies a predetermined threshold (e.g., is within a certain distance threshold). Of course, the fingerprint match module 240 may utilize other matching techniques in order to determine whether a query fingerprint matches a reference fingerprint, such as Euclidean, Cosine, KL-Divergence and/or Itakura distance measurement techniques, among other distance measurement techniques.

In some example embodiments, the video identification system 190 may utilize various different block sizes (e.g., number of frames, or frame rate) of fingerprints when matching a query fingerprint to a reference fingerprint. For example, the reference fingerprint may be set at 5 fps, and occupy approximately 560 KB/h of runtime given an 8-bit value (32 bytes/frame) for the fingerprint, and the query fingerprint, which may include offset errors, may be set at 15 fps or higher. In this example, a query of the index may involve querying multiple reference frames (e.g., three frames for a reference fingerprint) of the reference fingerprint index. As another example, the reference fingerprint may be set at 15 fps while the query fingerprint is set at 5 fps. In this example, comparing the query fingerprint to the reference fingerprint may involve comparing each of the query fingerprint frames to multiple reference frames of the reference fingerprint index.

Thus, in some example embodiments, the video identification system 190 may optimize a match rate for matching a query fingerprint to a reference fingerprint by modifying the block sizes of the fingerprints. For example, fingerprint match module 240 may match a query fingerprint to one second of reference video content, 0.5 second of reference video content, one minute of reference video content, and so on. In some cases, the precise time of the match may not be able to be determined. For example, if a video includes a still image, then any portion of the video showing the still image would match the entire length of the still image segment.

As discussed above, some patches may have different scales than other patches. Large-scale patches may be more important in identifying matches than low-scale patches. For example, using 1-bit values, a match may be identified based on the number of mismatched bits being below a threshold, with all bits being treated equally. As another example, a match may be identified based on a number of mismatched low-scale bits being below a first threshold and the number of mismatched large-scale bits being below a second threshold. The second threshold may be zero.

In some example embodiments, the identification module 250 is configured and/or programmed to identify video content captured at a client device 150 based on a determination that a query fingerprint matches at least one reference fingerprint. For example, the identification module 250 may identify the name or title of the video content, a location within the video content currently being presented by the client device 150, a channel or broadcaster providing the video content, and so on.

Figure 3:
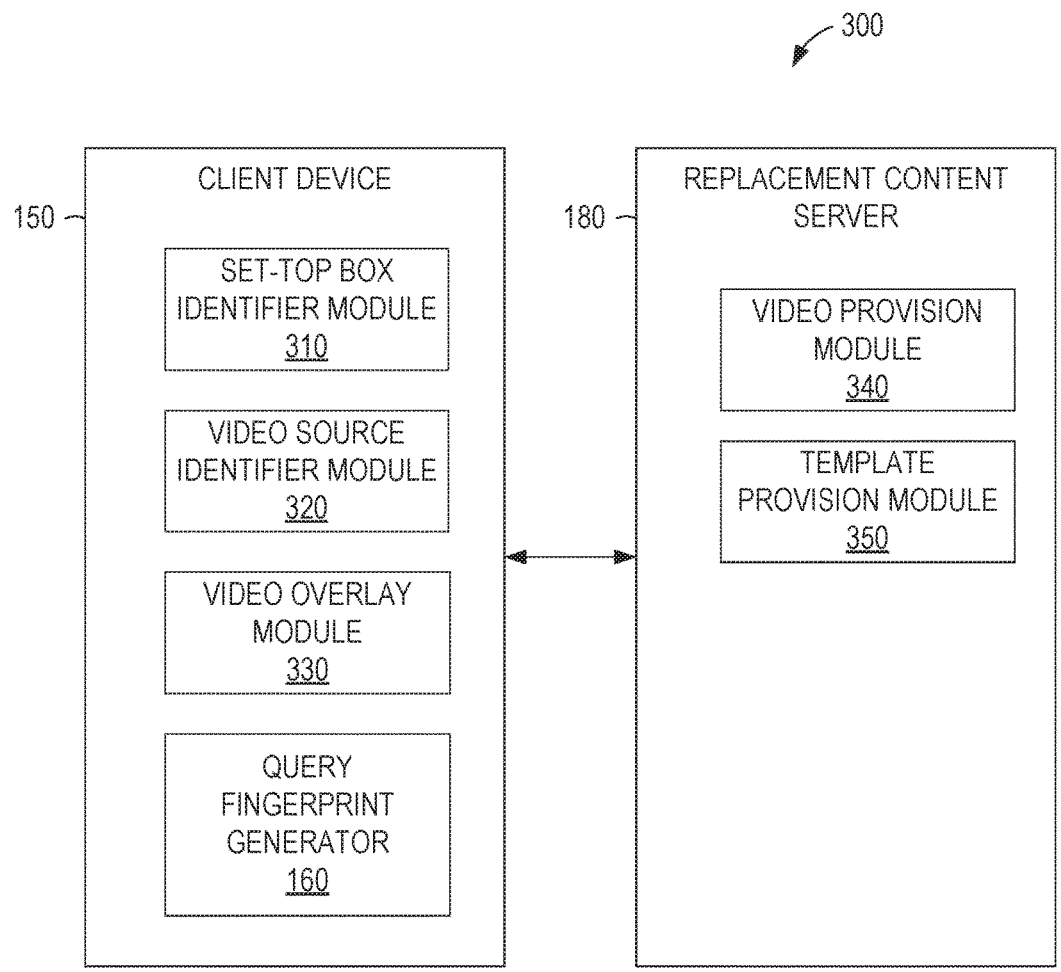
FIG. 3 is a block diagram illustrating components of a client device and a replacement content server, according to some example embodiments.

FIG. 3 is a block diagram 300 illustrating components of a client device 150 and a replacement content server 180, according to some example embodiments. The client device 150 includes a set-top box identifier module 310, a video source identifier module 320, and a video overlay module 330, all configured to communicate with each other. The replacement content server 180 includes a video provision module 340 and a template provision module 350.

The set-top box identifier module 310 identifies the set-top box 140 connected to the client device 150. For example, when the set-top box 140 and the client device 150 are connected by a High-Definition Multimedia Interface (HDMI) cable, the Extended Display Identification Data (EDID) of the set-top box 140 may serve to identify the set-top box 140.

As another example, the set-top box identifier module 310 may present a user interface on the client device 150 through which a user can identify the set-top box 140. This may be accomplished by having the user manually identify the set-top box 140 by selecting a make and model number from a drop-down list or entering the information into a text field. The user-interactive identification may also be accomplished by instructing the user to activate particular menu options of the set-top box 140. The client device 150 accesses a database of known menus from different set-top boxes and compares them to the video data received after the user activates the menu for the set-top box 140. When a match is found, the set-top box 140 has been identified. In some example embodiments, multiple user actions on the set-top box 140 are needed to uniquely identify the set-top box 140. For example, a first menu may serve to cut the possible matches by 80%, a second menu may serve to cut the possible matches by a further 80% (i.e., to 4% of the original set of possible matches), and a third menu may be needed to uniquely identify the set-top box 140.

The video source identifier module 320 identifies the source of video provided to the client device 150. In some example embodiments, the video source identifier module 320 is implemented by the query fingerprint generator 160.

The video overlay module 330 combines video data received from the replacement content server 180 with video data received from the set-top box 140 based on the particular set-top box identified by the set-top box identifier module 310. For example, a local commercial may be provided by the video provision module 340 based on the identification of a local video source by the video source identifier module 320. The local commercial may be displayed as a picture-in-picture that overlays a portion of the video data received from the set-top box 140. The portion to be overlaid may be determined based on the identification of the set-top box 140 by the set-top box identifier module 310.

The video provision module 340 of the replacement content server 180 provides replacement (or substitute) video content to the client device 150 based on the identified video source. For example, the video provision module 340 may access a database that maps local commercials for a number of localities to national commercials for particular broadcasters across the country. In this way, a particular national commercial of a national broadcaster may be replaced by different local commercials depending on the local broadcaster providing the signal to the set-top box 140.

The template provision module 350 of the replacement content server 180 provides templates to the client device 150 based on the identified set-top box. For example, set-top boxes by one manufacturer may have a different set of menu templates than set-top boxes by another manufacturer. Similarly, different models from the same manufacturer may have different sets of menu templates. Furthermore, different firmware revisions for the same model may have different sets of menu templates. Accordingly, a database that maps set-top box identifiers to sets of templates is maintained on the replacement content server 180 and transmitted, in full or in part, to the client device 150 upon request.

Templates may be generated manually or programmatically. For manual generation, a person works with a client device and a set-top box and, by manipulation of the set-top box, causes presentation of each of the different menus that can be generated by the set-top box. Through analysis of the presentation of the menus on a screen of the client device, the person generates a template for each distinct menu format. The templates are stored in the database of the replacement content server 180 for later access.

For programmatic generation of the templates, one or more client devices (e.g., client device 150) and corresponding set-top boxes (e.g., set-top box 140) are monitored while in use (e.g., through reporting of status by the client devices to the replacement content server 180). In some example embodiments, the client device or the replacement content server 180 determines when the video received from the set-top box contains a portion of known video data (e.g., a recognized cable program) and a portion of unknown video data using fingerprinting of regions (e.g., quadrants or sixteenths of the screen area). The unknown video data is assumed to be additional video content supplied by the set-top box. Accordingly, a pixel-level analysis of the received video data is performed by the replacement content server 180 to determine the region occupied by the known video data, the region occupied by the unknown video data, and the region occupied by a blend of known and unknown video data (e.g., through alpha blending). From the regions, a template is generated and, if not already stored in the database, stored in the database of the replacement content server 180 for later access.

In some example embodiments, programmatic generation of the templates involves monitoring multiple frames of video data received by the client device from the set-top box. By comparing the sequential frames of video data, regions of the video data that are changing rapidly can be distinguished from regions that are static or undergo relatively few changes. From this analysis, it can be inferred that the rapidly changing regions are displaying video programming and the static regions are displaying information provided by the set-top box. Likewise, a region that is rapidly changing but has an average color substantially different from that of the remainder of the video data may indicate that blending of dynamic video with a static overlay is occurring. Accordingly, a blending region may also be identified through the multi-frame analysis. From the regions, a template is generated and, if not already stored in the database, stored in the database of the replacement content server 180 for later access.

Figure 4:
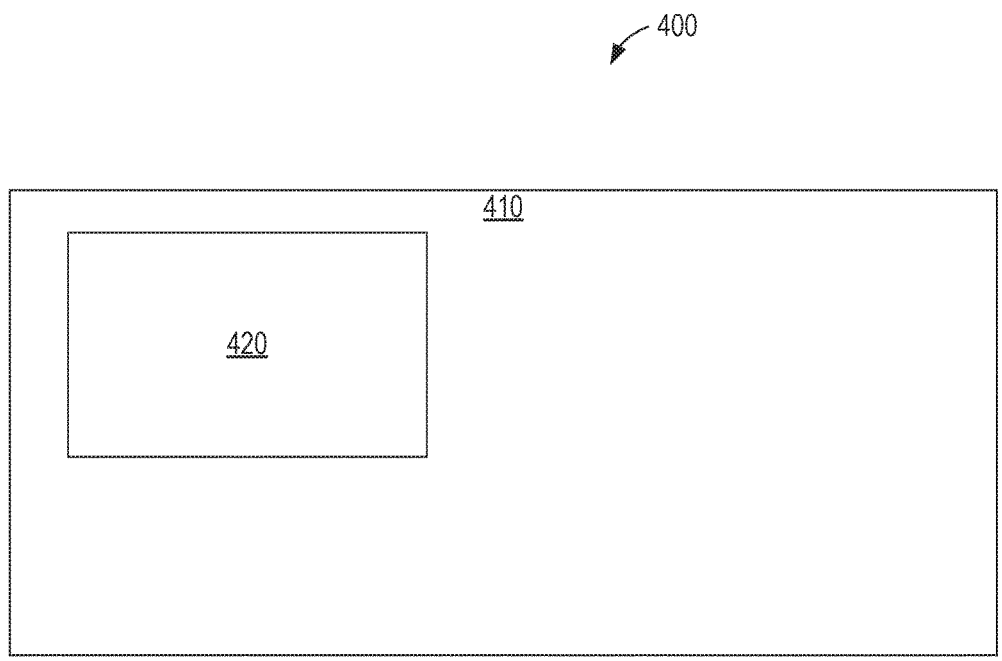
FIG. 4 is a display diagram, in an example embodiment, illustrating a dynamic video overlay.

FIG. 4 is a display diagram 400, in an example embodiment, illustrating a dynamic video overlay comprising a region 410 and a region 420 of a display area of the client device 150. Video received from the set-top box 140 is passed through for display in the region 410. Replacement video data is presented in the region 420. As can be seen in the example of FIG. 4, the region 420 is a rectangular region that is smaller than the display area of the client device 150. The region 420 also has no edges in common with the display area. In other example embodiments, the region 420 has other shapes, sizes, and positions. In some example embodiments, a menu for the set-top box occupies the region 410 and the original video data received from the content source 110 is scaled (e.g., shrunk), repositioned by the set-top box 140, and sent from the set-top box 140 to the client device 150 in the region 420. Accordingly, when the replacement video data is presented in the region 420, the video data received from the content source 110 is replaced while the menu shown in the region 410 remains visible to the user.

Figure 5:
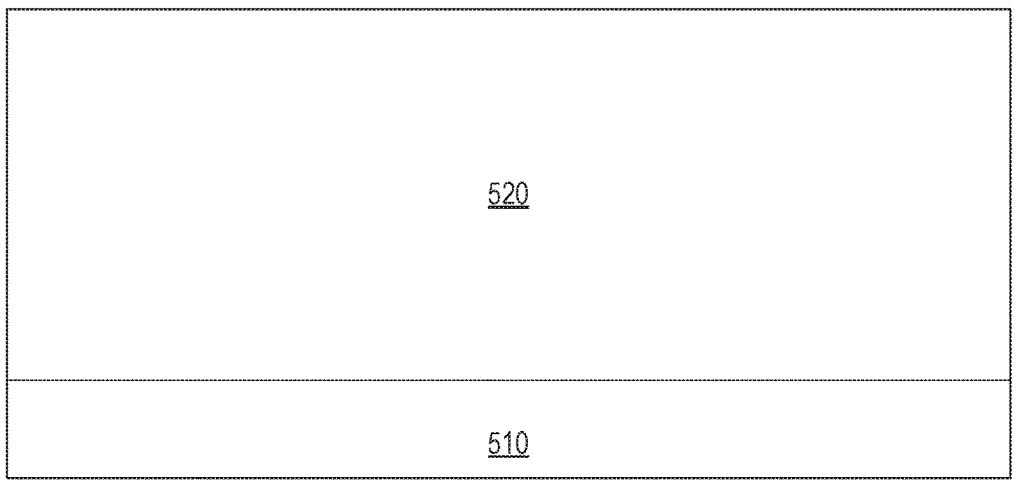
FIG. 5 is a display diagram, in an example embodiment, illustrating a dynamic video overlay.

FIG. 5 is a display diagram 500, in an example embodiment, illustrating a dynamic video overlay comprising a region 510 and a region 520 of a display area of the client device 150. Video received from the set-top box 140 is passed through for display in the region 510. The replacement video data received from the replacement content server 180 is cropped to, and presented in, the region 520. In some example embodiments, a menu for the set-top box 140 occupies the region 510 and a portion of the original video data received from the content source 110 is cropped by the set-top box 140 to the region 520 and sent from the set-top box 140 to the client device 150 in the region 520. Accordingly, when the portion of the replacement video data is presented in the region 520, the video data received from the content source 110 is replaced while the menu shown in the region 510 remains visible to the user. As can be seen in FIG. 5, the top edge of the region 520 is identical to the top edge of the display area, and the left and right edges of the region 520 are shared with the left and right edges of the display area, but the region 520 does not occupy the full height of the display.

Figure 6:
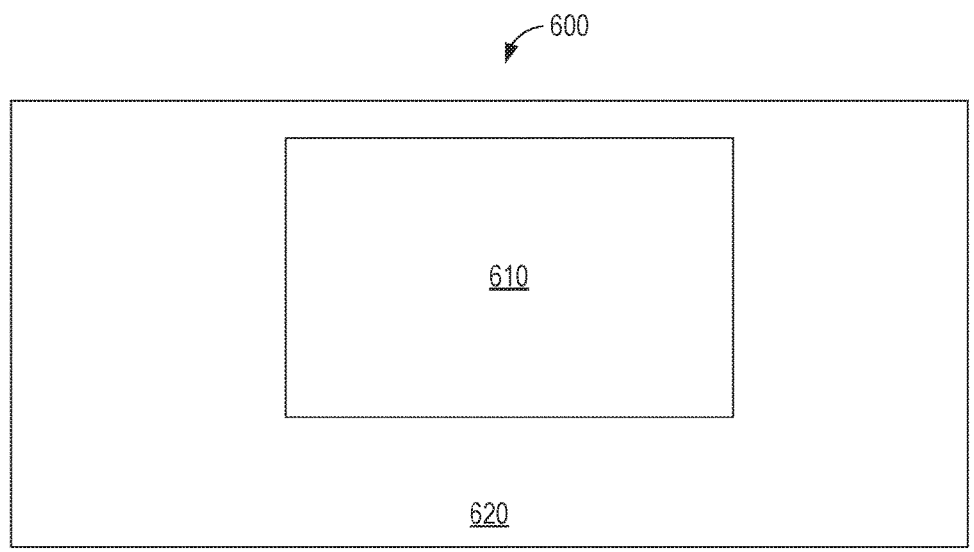
FIG. 6 is a display diagram, in an example embodiment, illustrating a dynamic video overlay.

FIG. 6 is a display diagram 600, in an example embodiment, illustrating a dynamic video overlay comprising a region 610 and a region 620 of a display area of the client device 150. Video received from the set-top box 140 is passed through for display in the region 610. The replacement video data received from the replacement content server 180, less the portion corresponding to the region 610, is presented in the region 620. In some example embodiments, a menu for the set-top box occupies the region 610 and a portion of the original video data received from the content source 110 corresponding to the region 620 is sent from the set-top box 140 to the client device 150 in the region 620. Accordingly, when the portion of the replacement video data is presented in the region 620, the video data received from the content source 110 is replaced while the menu shown in the region 610 remains visible to the user.

Figure 7:
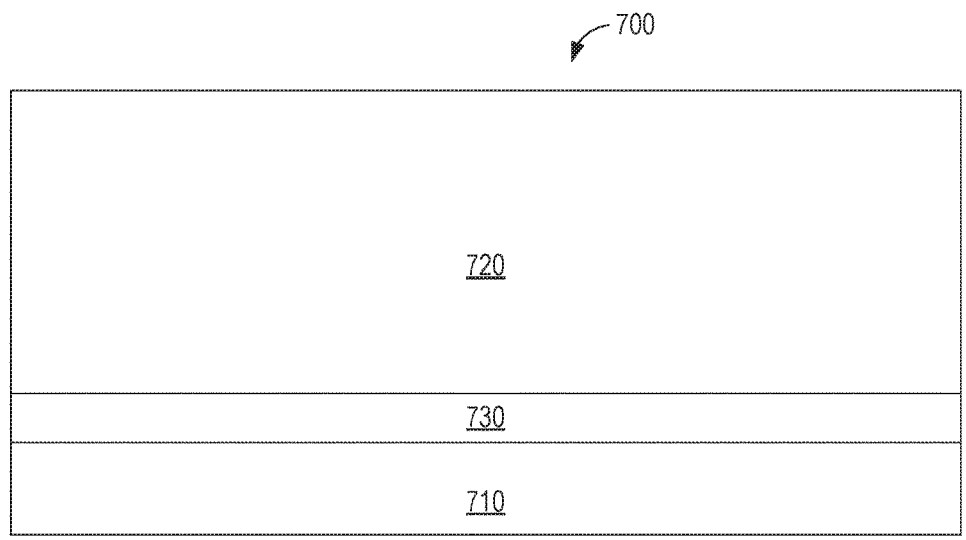
FIG. 7 is a display diagram, in an example embodiment, illustrating a dynamic video overlay.

FIG. 7 is a display diagram 700, in an example embodiment, illustrating a dynamic video overlay comprising a region 710, a region 720, and a region 730 of a display area of the client device 150. Video received from the set-top box 140 is passed through for display in the region 710. The replacement video data received from the replacement content server 180, less the portion corresponding to the region 710, is presented in the region 720. Video received from the set-top box 140 is blended with the replacement video data and presented in the region 730. For example, a gradient may be applied such that the portion of the region 730 bordering the region 710 is entirely (or almost entirely) made up of video received from the set-top box 140, and the portion of the region 730 bordering the region 720 is entirely (or almost entirely) made up of the replacement video.

In some example embodiments, further image processing is applied in the region 730 to reverse the application of image processing by the set-top box 140. For example, the set-top box 140 may have blended information provided by the set-top box 140 with the input video stream. Thus, this blended information may be considered to be a third video component, distinct from the first video component corresponding to the input video to the set-top box 140 and the second video component corresponding to the overlay information provided by the set-top box 140. To eliminate the input video stream entirely from the output of the video overlay module 330, further filtering is applied to the region of the third video component (e.g., the region 730).

In some example embodiments, the filtering applied depends on the brightness. Portions of the region 730 that exceed a predetermined brightness value are determined to be in the foreground and to contain information that should be passed on to the user. Portions of the region 730 that fall below the predetermined brightness value are determined to be in the background, and thus any information contained should be filtered out. In other example embodiments, to filter out the background information, the color of each background pixel is changed to the average color of all background pixels. For example, a light blue background superimposed over a video of a football game will, once averaged, maintain a light blue tint and not convey any information about the football game. In other example embodiments, the background color is stored in the template. Accordingly, the color of the foreground pixels is maintained, and the remaining pixels are replaced with the background color.

In further example embodiments, the image processing reverses the image processing performed by the set-top box 140 using the input video stream. For example, by identifying the input video stream (e.g., through fingerprinting), the original input video stream can be accessed (e.g., from the video identification system 190). By applying the reverse of the modification applied by the set-top box 140, the information overlaid by the set-top box 140 is recovered. For example, if the set-top box 140 generated the output video by blending the overlay information at an 80% weight with the input video information at a 20% weight, then the client device 150 can reverse the process by subtracting a 20% weight of the input video and multiplying the remainder by 1.25. The recovered overlay can then be applied to the replacement video content by applying the same blend as was previously applied by the set-top box 140. In this example, that would mean generating pixels for display by taking an 80% weight of the overlay with a 20% weight of the replacement video content.

Figure 8:
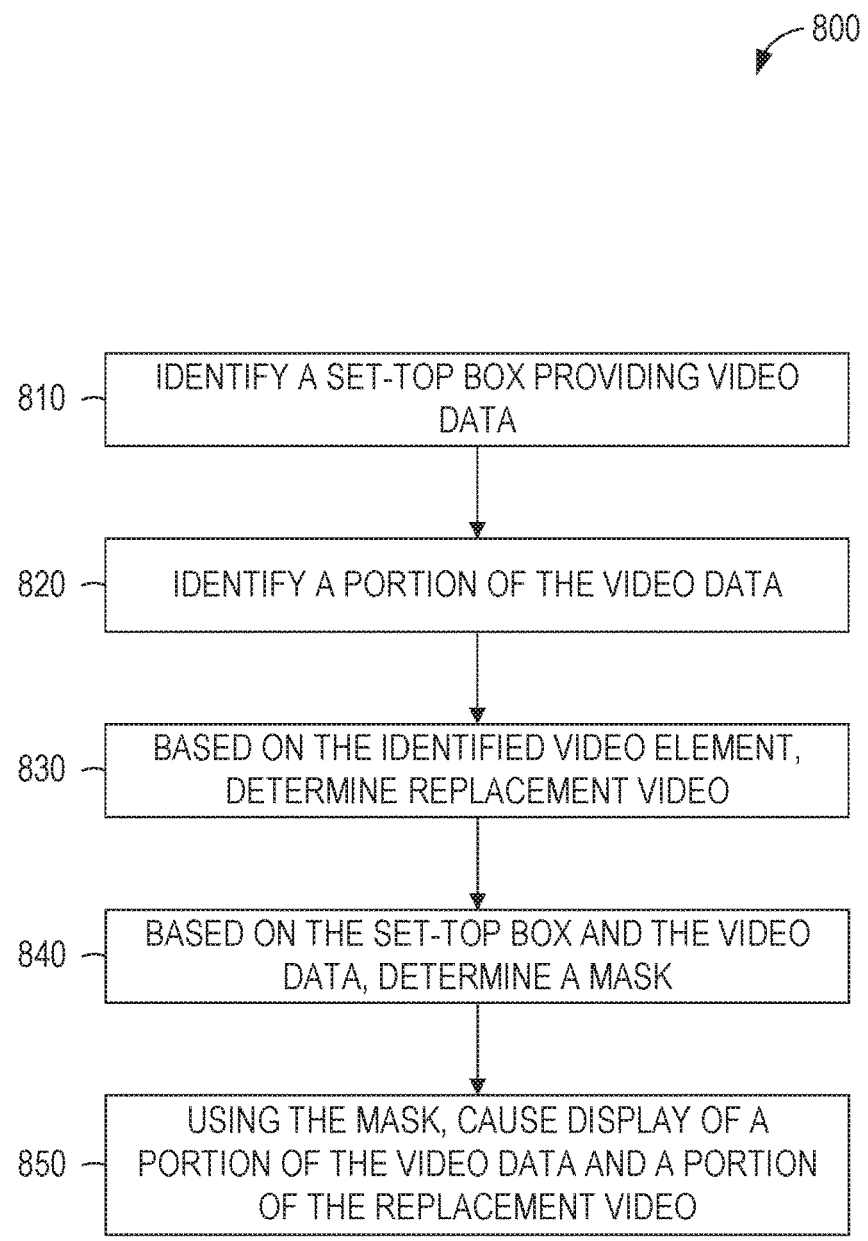
FIG. 8 is a flowchart illustrating a method, in some example embodiments, for dynamically providing a video overlay.

FIG. 8 is a flowchart illustrating a method 800, in some example embodiments, for dynamically providing a video overlay. The method 800 includes operations 810, 820, 830, 840, and 850. By way of example and not limitation, the operations 810-850 are described as being performed by the components 110-190 of FIG. 1, the modules of 210-250 of FIG. 2, and the modules 310-350 of FIG. 3.

In operation 810, the set-top box identifier module 310 identifies a set-top box (e.g., the set-top box 140) providing video data to a client device (e.g., the client device 150). For example, when the set-top box 140 and the client device 150 are connected by an HDMI cable, the EDID of the set-top box 140 may serve to identify the set-top box 140. As another example, the set-top box identifier module 310 may present a user interface on the client device 150 through which a user can identify the set-top box 140 (e.g., by selecting from a list of options). As a third example, the set-top box identifier module 310 may send its internet protocol (IP) address to the replacement content server 180 (or another server) for lookup. In this example, the receiving server maintains a database that maps IP addresses to cable company service areas and maps cable companies to their preferred set-top boxes. Accordingly, the IP address of the client device 150 may be used to identify the type of device most likely to be the set-top box 140.

Once the set-top box 140 is identified by the set-top box identifier module 310, an identifier for the set-top box 140 is stored in the client device 150 for later access. For example, the user may be prompted on a first use of the client device 150 to identify the set-top box 140, and not prompted on future uses since the information can be accessed from storage.

The video source identifier module 320 identifies a portion of the received video data (operation 820). For example, the received video data may include a broadcast TV signal overlaid with a menu generated by the set-top box 140. Using the patch selection module 210 and the value calculation module 220 to generate one or more fingerprints for the received video data, the client device 150 sends the fingerprints to the video identification system 190. In response, the client device 150 receives an identifier corresponding to the broadcast TV signal, which serves to identify the portion of the received video data containing the broadcast TV signal.

Alternatively, operation 820 may be performed by analyzing the video data for specific patterns without fingerprinting. For example, a particular video overlay provided by the set-top box 140 or the client device 150 may include a brand name in a particular location on the screen. Accordingly, that portion of the screen can be compared against a captured image of the brand name to determine when the particular video overlay is present. As another example, a particular video overlay may include an icon in a particular location on the screen or the notification. To illustrate, a telephone icon may be shown in a notification regarding an incoming telephone call. Accordingly, various portions of the screen are compared against a stored image of the telephone icon to determine when the notification is present. The pseudocode below is representative of some example embodiments:

```
templateID templateMatch(videoInStream, deviceID) {
    // iterate over available templates for the intermediate device
    // until a match is found for the input stream
    // return the templateID of the matching stream, or 0 if none.
    matchFound = 0;
    do {
        currentTemplate = getNextTemplate(deviceID);
        if (singleTemplateMatch(videoInStream, currentTemplate))
            matchFound = currentTemplate;
    } until (matchFound != 0)
    return matchFound;
}
Boolean singleTemplateMatch(videoInStream, template) {
    // compare the template to the input stream
    // return TRUE if the template matches, FALSE otherwise
    region = template.region;
    count = 0;
    for (x = region.x; x < region.width; x++)
        for (y = region.y; y < region.height; y++)
            if ((videoInStream.currentFrame(x,y) - template(x,y)) ** 2) <=
PIXEL_MATCH_DIFFERENCE)
                count++;
    // for exact pixel matching, PIXEL_MATCH_DIFFERENCE = 0
    maxCount = x*y;
    threshold = PERCENT_THRESHOLD * maxCount;
    if (count >= threshold)
        return TRUE;
    else
        return FALSE;
}
```

The example implementation of singleTemplateMatch( ), above, uses the square of the difference between corresponding pixels as a distance measure. Other example embodiments use the absolute value of the difference, the normalized square of the difference, the correlation coefficient, the normalized correlation coefficient, the cross correlation, the normalized cross correlation, or any suitable combination thereof.

In operation 830, the client device 150 or the replacement content server 180 determines replacement video based on the identified video data and/or profile information associated with the client device 150. For example, a PG-rated substitute version of R-rated content may be selected based on the identification of the particular R-rated content. As another example, a local commercial may be selected to replace a particular national commercial.

The video overlay module 330, in operation 840, determines an overlay mask based on the identified set-top box and the video data. In some example embodiments, the video data is compared to a set of known video frames to determine if a particular menu or other informational element is being displayed by the set-top box 140. For example, an informational bar may be presented at the top of the screen by the set-top box 140, in which certain pixels are black and in which a certain area has an average pixel color within the range of (110,110,110)-(160,160,160), expressed as red-green-blue (RGB) color tuples. Accordingly, when one frame, or a set of sequential frames, of the received video data has the characteristics of the informational bar, the video overlay module 330 identifies a corresponding overlay mask, in which a pass-through portion corresponds to the area occupied by the bar and a replacement portion corresponds to the area occupied by the original video content received by the set-top box 140.

Templates, such as those corresponding to the examples presented in FIGS. 4-7, may indicate the region or zone of an overlay in several different ways. For example, coordinates of the boundaries of the overlay zone may be provided by the template. Alternatively, a bitmap of the entire display may indicate the overlay zone (e.g., with a value of 1 indicating that the corresponding pixel is part of the overlay and a value of 0 indicating that the corresponding pixel is not part of the overlay).

In the above example, the mask is selected to allow the user to see both the overlay information generated by the set-top box and the replacement video content. In some example embodiments, the mask is selected to suppress the overlay information generated by the set-top box. For example, optical character recognition (OCR) may be performed on the overlay information to identify any text contained therein. Based on the text, a database lookup may be performed to determine if the overlay should be passed through or suppressed. When the overlay is to be suppressed, a mask is chosen that presents the replacement video content in the region of the overlay. The two approaches may also be mixed, allowing some overlay content to be presented to the user and other overlay content to be suppressed. For example, if an overlay is presenting text information associated with the input video content, such as a description of a product being displayed, the text information is not likely to be relevant to the replacement video content. Accordingly, suppressing the text information improves the experience of the user in viewing the replacement video content.

In operation 850, the video overlay module 330 causes the display of a portion of the video data and a portion of the replacement video, using the mask. Continuing with the example above, the video data containing the informational bar, corresponding to the pass-through portion of the mask, is displayed along with a portion of the replacement video corresponding to the replacement portion of the mask. In some example embodiments, the display of the portion of the replacement video comprises repositioning or resizing the replacement video. For example, if the mask of FIG. 4 is used, the replacement video is reduced in size and repositioned to occupy the region 420.

In some example embodiments, the mask changes over time. For example, the overlaid information presented by the set-top box 140 may be animated and change position over time. Accordingly, the location of the regions in which the received video data and the replacement video data are presented may change over time. In some examples, changing the mask and/or size/location of replacement video over time may be carried out by repeating operations 840 and 850. For instance, operations 840 and 850 may be repeated in an iterative fashion until the video overlay module 330 no longer determines that an overlay mask should be used (e.g., when the incoming video no longer matches a template having a corresponding mask). In some examples, changing the mask and/or size/location of replacement video over time may be carried out based on a predetermined timed routine that is associated with a particular mask and/or template (e.g., an animation routine in which aspects of the mask change over time in a predictable manner).

The method 800 may also be performed, with slight modifications, to compensate for video elements provided by the client device 150. The video elements provided by the client device 150 may be detected by analysis of the video data, in the same manner as those provided by the set-top box 140. Alternatively, the client device 150 may report, user interactions to the video overlay module 330. For example, when the client device 150 receives a user command to display a menu, that information may be provided to the video overlay module 330. Based on the particular menu being displayed, the video overlay module 330 identifies the mask to apply.

Figure 9:
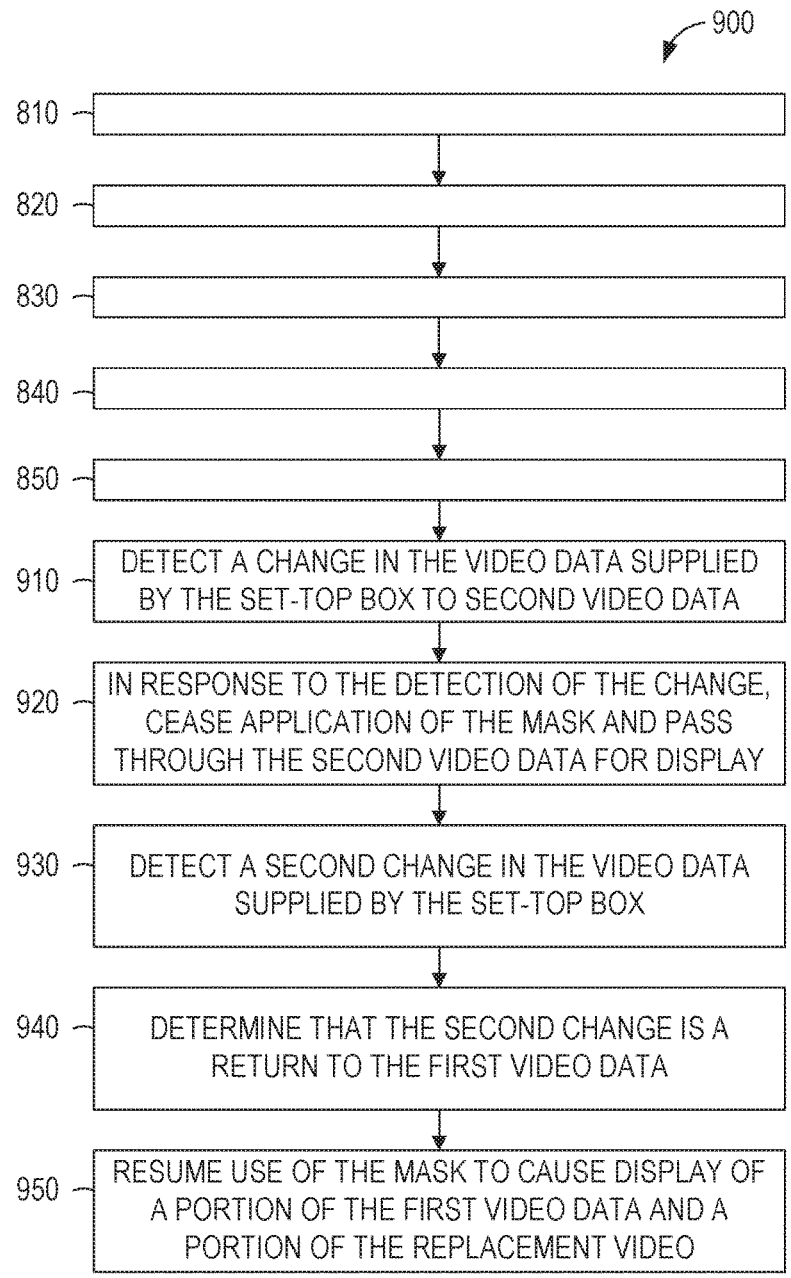
FIG. 9 is a flowchart illustrating a method, in some example embodiments, for dynamically providing a video overlay.

FIG. 9 is a flowchart illustrating a method 900, in some example embodiments, for dynamically providing a video overlay. The method 900 includes operations 810-850) and 910-950. The operations 810-850 are described above, with respect to FIG. 8. By way of example and not limitation, the operations 910-950 are described as being performed by the components 110-190 of FIG. 1, the modules of 210-250 of FIG. 2, and the modules 310-350 of FIG. 3.

In operation 910, the client device 150 detects a change in the video data supplied by the set-top box 140 to second video data. For example, the user of the set-top box 140 may have changed the channel being displayed.

In response to the detection of the change, the video overlay module 330 ceases application of the mask and allows the entirety of the received video from the set-top box 140 to be displayed (operation 920). Accordingly, the user of the set-top box 140 will see the effect of the changed channel.

In operations 930 and 940, the client device 150 detects a second change in the video data supplied by the set-top box 140. The second change returns the received video data to the prior state. For example, the user of the set-top box 140 may have returned to the original video channel being displayed. The detection may be accomplished by receiving a set of expected fingerprints from the video identification system 190 and comparing the expected fingerprints with the fingerprints generated by the query fingerprint generator 160. Accordingly, when the user changes channels away from the identified content, the fingerprints will stop matching, and when the user changes channels back to the identified content, the fingerprints will resume matching.

In operation 950, in response to the determination that the second change is a return to the first video data, the video overlay module 330 resumes the use of the mask to cause display of a portion of the first video data and a portion of the replacement video. Accordingly, the user of the client device 150 will perceive the return to the replacement video presented in operation 850.

Figure 10:
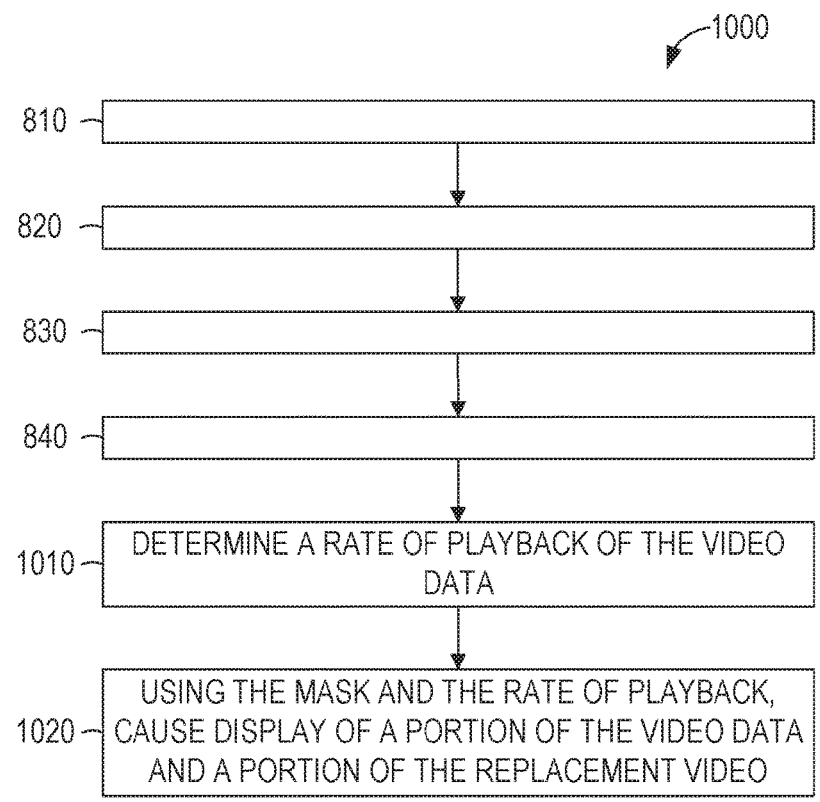
FIG. 10 is a flowchart illustrating a method, in some example embodiments, for dynamically providing a video overlay.

FIG. 10 is a flowchart illustrating a method 1000, in some example embodiments, for dynamically providing a video overlay. The method 1000 includes operations 810, 820, 830, 840, 1010, and 1020. The operations 810-840 are described above, with respect to FIG. 8. By way of example and not limitation, the operations 1010 and 1020 are described as being performed by the components 110-190 of FIG. 1, the modules of 210-250 of FIG. 2, and the modules 310-350 of FIG. 3.

In operation 1010, the video source identifier module 320 determines a rate of playback of the identified video data. For example, the video identification system 190 may provide a set of expected fingerprints for the video data that are compared to the fingerprints generated for the received video data. Accordingly, when the fingerprints for successive frames of received video data match non-sequential expected fingerprints (e.g., every second or fourth fingerprint), a determination is made that the received video is playing at a different rate than (e.g., twice or four times as fast as) the reference video used by the video identification system 190.

In operation 1020, the video overlay module 330 causes display of a portion of the video data received from the set-top box 140 and a portion of the replacement video based on the mask and the rate of playback. For example, as in operation 850, the mask is used to determine which portion of the video received from the set-top box 140 is passed through and which portion is replaced by the replacement video. Additionally, the rate of playback is used to control the rate of playback of the replacement video. In this manner, the user of the client device 150 and the set-top box 140 perceives that playback controls such as fast-forward, rewind, and pause operate on the replacement video in the same manner as they would operate on the originally displayed video.

Figure 11:
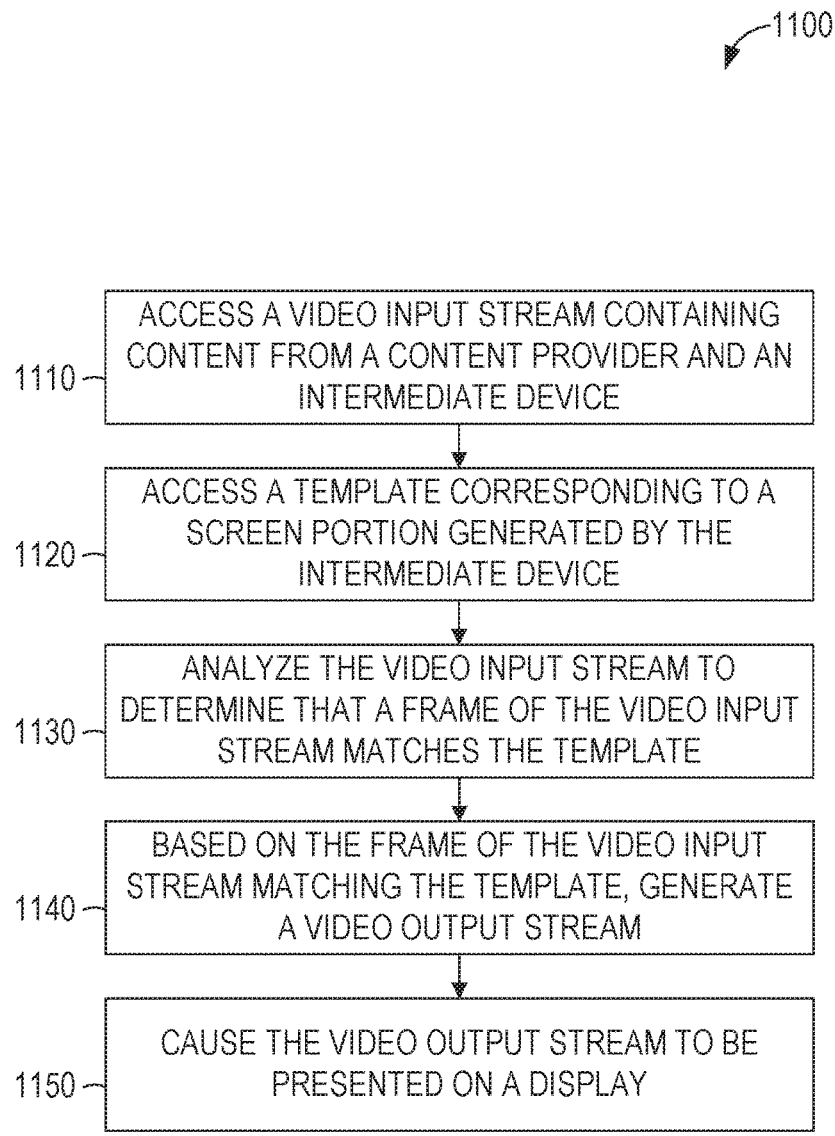
FIG. 11 is a flowchart illustrating a method, in some example embodiments, for dynamically providing a video overlay.

FIG. 11 is a flowchart illustrating a method, in some example embodiments, for dynamically providing a video overlay. The method 1100 includes operations 1110-1150. By way of example and not limitation, the operations 1110-1150 are described as being performed by the components 110-190 of FIG. 1, the modules of 210-250 of FIG. 2, and the modules 310-350 of FIG. 3.

In operation 1110, the set-top box identifier module 310 of the client device 150 accesses a video input stream containing content from a content provider (e.g., the content source 110) and an intermediate device (e.g., the set-top box 140). For example, the set-top box 140 may have received a video stream from the content source 110 via a cable connection, modified the video stream, and transmitted the modified video stream to the client device 150 via an HDMI connection. The video input stream may be accessed by the client device 150 as it is received or from data storage (e.g., from a solid-state drive integrated into the client device 150).

The set-top box identifier module 310, in operation 1120, accesses a template corresponding to a screen portion generated by the intermediate device. For example, certain image manipulations performed by the intermediate device may be known to the client device 150. The image manipulations may correspond to particular portions of the screen. To illustrate, the set-top box 140 may modify the video stream received from the content source 110 by placing a menu at the top or bottom of the screen. The template accessed by the set-top box identifier module 310 corresponds to the screen portion containing video generated by the intermediate device.

In operation 1130, the set-top box identifier module 310 analyzes the video input stream to determine that a frame of the video input stream matches the template. For example, the template may indicate certain pixels that will be particular colors when the video input stream contains the menu generated by the set-top box 140. Each incoming frame of video may be compared to the template to determine if the screen portion likely contains the menu. Some frames of video may not be analyzed. For example, every other frame or every fifth frame may be compared to the template, thereby reducing the amount of processor time spent on the comparisons. In some example embodiments, operation 1130 is only performed while replacement content is being presented, thereby reducing the opportunity for false positives to be generated.

The template matching may be performed using a pixel-by-pixel comparison of a downsampled version of a frame of the video input stream with a downsampled version of the template. A pixel-distance between the (down sampled) frame and the template may be calculated. For example, the number of non-matching pixels may be used as the pixel difference. Alternatively, a color distance for each pixel may be calculated (e.g., in the RGB; luminance and chroma (YUV); hue, saturation, and lightness (HSL); or hue, saturation, and value (HSV) color spaces) and the sum of the absolute values of the color distances taken as the pixel-distance. The determined pixel-distance is compared to a threshold to determine if the template is a match for the video input stream. In some example embodiments, the template and the video input stream are cross-correlated. Cross-correlation allows for the handling of multi-frame templates by determining a measure of similarity of the frame sequences when one sequence lags behind the other.

In some example embodiments, multiple templates are compared to the video input stream. For example, table 1640 of FIG. 16 may store templates for each of a plurality of set-top boxes. Each template in the table 1640 includes a bitmap that indicates which pixels of the video input stream are to be compared with the pixels of the image of the template. Even when the set-top box 140 has already been identified, multiple templates of multiple types are available to be compared to the video input stream. In some example embodiments, the templates are sorted by computational complexity, such that less computationally expensive templates are tested first. The first matching template may be used, halting the comparison process. Alternatively, all templates may be compared and the best match (e.g., the template with the lowest pixel-distance from the video input stream frame) used.

The video overlay module 330, in operation 1140, generates a video output stream based on the determination that the frame of the video input stream matches the template. For example, if the content from the content source 110 is being replaced by the client device 150 with replacement content and a determination is made that the set-top box 140 is providing supplemental content, such as a menu, the video output stream may be modified to include the menu when the menu is detected, such as by applying a suitable overlay mask to allow the menu to appear in the video output stream.

In operation 1150, the video overlay module 330 causes the video output stream to be presented on a display (e.g., a display of the client device 150). Some client devices 150 provide an application programming interface (API) that allows for the video overlay module 330 to specify a portion of the display in which to present the video input stream and another portion of the display in which to present replacement video content. For example, the portions may be specified using the corner coordinates of a rectangular region, by using a 1-bit transparency mask that indicates on a pixel-by-pixel basis whether the video input stream pixel or the replacement pixel should be used, or by using an alpha mask that indicates on a pixel-by-pixel basis a degree of blending between the video input stream pixel and the replacement pixel. For those client devices 150, the API may be used. Otherwise, any partial blending or replacement is performed by the video overlay module 330.

Figure 12:
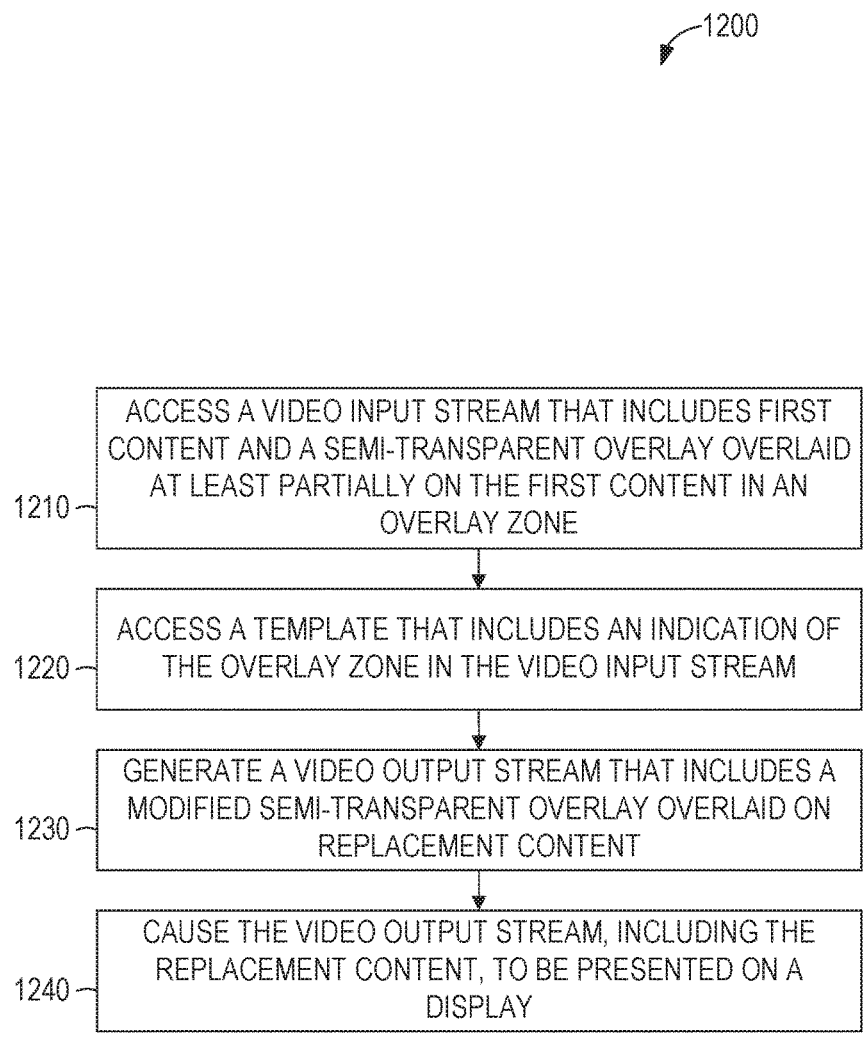
FIG. 12 is a flowchart illustrating a method, in some example embodiments, for dynamically providing a video overlay.

FIG. 12 is a flowchart illustrating a method 1200, in some example embodiments, for dynamically providing a video overlay. The method 1200 includes operations 1210-1240. By way of example and not limitation, the operations 1210-1240 are described as being performed by the modules of 210-250 of FIG. 2 and the modules 310-350 of FIG. 3.

In operation 1210, the set-top box identifier module 310 of the client device 150 accesses a video input stream that includes first content and a semi-transparent overlay overlaid at least partially on the first content in an overlay zone. For example, the first content may be content from a content provider (e.g., the content source 110) and the semi-transparent overlay may be provided by an intermediate device (e.g., the set-top box 140). For example, the set-top box 140 may have received a video stream from the content source 110 via a cable connection, modified the video stream, and transmitted the modified video stream to the client device 150 via an connection. The video stream may be accessed by the client device 150 as it is received or from data storage (e.g., from a solid-state drive integrated into the client device 150).

The set-top box identifier module 310, in operation 1220, accesses a template that includes an indication of the overlay zone in the video input stream. For example, certain image manipulations performed by the intermediate device may be known to the client device 150. The image manipulations may correspond to particular portions of the screen. To illustrate, the set-top box 140 may modify the video stream received from the content source 110 by placing a semi-transparent menu at the top or bottom of the screen. The template accessed by the set-top box identifier module 310 corresponds to the screen portion containing the semi-transparent overlay generated by the intermediate device (e.g., the set-top box 140).

The video source identifier module 320 may identify the content using fingerprinting. For example, the received video data may include a broadcast TV signal overlaid with a semi-transparent menu generated by the set-top box 140. Using the patch selection module 210 and the value calculation module 220 to generate one or more fingerprints for the received video data, the client device 150 sends the fingerprints to the video identification system 190. In response, the client device 150 receives an identifier corresponding to the broadcast TV signal, which serves to identify the portion of the received video data containing the broadcast TV signal.

The video overlay module 330, in operation 1230, generates a video output stream that includes a modified semi-transparent overlay overlaid on replacement content. For example, if the content from the content source 110 is being replaced by the client device 150 with replacement content and a determination is made that the set-top box 140 has added a semi-transparent overlay to the content from the content source 110, the video output stream includes the replacement content and a modified version of the semi-transparent overlay. In operation 1240, the video overlay module 330 causes the video output stream to be presented on a display (e.g., a display of the client device 150).

The pseudocode methods below are representative of some alternative embodiments:

```
semitransparentOverlayTransfer(inputVideoStream, identifiedVideoContent,
overlayRegion) {
    // inputVideoStream is the received video stream
    // identifiedVideoContent is the content as transmitted from the content
    // provider, without the modifications performed by the intermediate device
    // overlayRegion identifies the region defined by the template that was detected
    // prior to invocation of this method, outputVideoStream contains
    // replacement content, without the semi-transparent overlay
    for (each pixel in overlayRegion) {
        // transfer the modifications performed by the intermediate device
        // to the replacement content
        delta = inputVideoStream(pixel) - identifiedVideoContent(pixel);
        outputVideoStream(pixel) += delta;
    }
}
semitransparentOverlayTransfer(inputVideoStream, identifiedVideoContent,
overlayRegion) {
    // inputVideoStream is the received video stream
    // identifiedVideoContent is the content as transmitted from the content
    // provider, without the modifications performed by the intermediate device
    // overlayRegion identifies the region defined by the template that was detected
    // prior to invocation of this method, outputVideoStream contains
    // replacement content, without the semi-transparent overlay
    for (each pixel in overlayRegion) {
        // if the pixel has been substantially changed by the intermediate
        // device, use the changed pixel instead of the corresponding pixel of
        // replacement content
        delta = inputVideoStream(pixel) - identifiedVideoContent(pixel);
        if (delta > PIXEL_OVERLAY_THRESHOLD)
            outputVideoStream(pixel) = inputVideoStream(pixel);
    }
}
semitransparentOverlayTransfer(inputVideoStream, identifiedVideoContent,
overlayRegion, transparency) {
    // inputVideoStream is the received video stream
    // identifiedVideoContent is the content as transmitted from the content
    // provider, without the modifications performed by the intermediate device
    // overlayRegion identifies the region defined by the template that was detected
    // transparency is a value between 0 and 1, indicating the degree of
    // transparency of the semitransparent overlay (0 indicating full opacity and
    // 1 full transparency) as used by the intermediate device
    // prior to invocation of this method, outputVideoStream contains
    // replacement content, without the semi-transparent overlay
    for (each pixel in overlayRegion) {
        // the result from the intermediate device is contentVideoStream *
        // (transparency) + overlayPixel * (1 - transparency)
        // solving for overlayPixel gives:
        overlayPixel = (inputVideoStream(pixel) - identifiedVideoContent(pixel) *
transparency) / (1 - transparency);
        // now apply the original overlay to our output
        outputVideoStream(pixel) *= transparency;
        outputVideoStream(pixel) += overlayPixel * (1 - transparency);
    }
}
semitransparentOverlayTransfer(inputVideoStream, overlayRegion, transparency) {
    // inputVideoStream is the received video stream
    // overlayRegion identifies the region defined by the template that was detected
    // transparency is a value between 0 and 1, indicating the degree of
    // transparency of the semitransparent overlay (0 indicating full opacity and
    // 1 full transparency) to use in the output. The transparency may be, but
    // need not be, the same as that used by the intermediate device
    // prior to invocation of this method, outputVideoStream contains
    // replacement content, without the semi-transparent overlay
    // identify the color of the semi-transparent overlay as the average color of
    // the overlay region (e.g., random un-modified pixels should average to a
    // neutral gray, such as RGB (128, 128, 128), pixels modified by a semi-
    // transparent overlay should average to the color of the overlay)
    // Alternatively, the overlayColor may be included as data for the template rather than
    // calculated from the inputVideoStream
    overlayColor = average(pixels in overlay region);
    // pixels in the overlay region are either background pixels or foreground pixels.
    // background pixels are those that have color values within a predetermined
    // range of the overlay color; foreground pixels are those that are outside
    // of the predetermined range
```

```
    for (each pixel in overlayRegion) {
      // the calculation of delta is represented as a simple subtraction, but
      // could be implemented as a Euclidian distance in a color space
      delta = inputVideoStream(pixel) − overlayColor;
      // copy foreground pixels without change, but apply transparency to
      // background pixels
      if (delta > PIXEL_OVERLAY_THRESHOLD)
        outputVideoStream(pixel) = inputVideoStream(pixel);
      else {
        outputVideoStream(pixel) *= transparency;
        outputVideoStream(pixel) += overlayColor * (1 − transparency);
      }
    }
  }
}
semitransparentOverlayTransfer(inputVideoStream, overlayRegion, transparency,
textColor) {
  // inputVideoStream is the received video stream
  // overlayRegion identifies the region defined by the template that was detected
  // transparency is a value between 0 and 1, indicating the degree of
  // transparency of the semitransparent overlay (0 indicating full opacity and
  // 1 full transparency) to use in the output. The transparency may be, but
  // need not be, the same as that used by the intermediate device
  // prior to invocation of this method, outputVideoStream contains
  // replacement content, without the semi-transparent overlay
  // identify the color of the semi-transparent overlay as the average color of
  // the overlay region (e.g., random un-modified pixels should average to a
  // neutral gray, such as RGB (128, 128, 128), pixels modified by a semi-
  // transparent overlay should average to the color of the overlay)
  // Alternatively, the overlayColor may be included as data for the template rather
  // than calculated from the inputVideoStream
  // textColor is a color value, the color value used for text by the intermediate
  // device
  overlayColor = average(pixels in overlay region);
  for (each pixel in overlayRegion) {
    // copy text without change, but apply transparency to background pixels
    // the pixels containing input text are, in the aggregate, the text portion
    // of the inputVideoStream
    if (inputVideoStream(pixel) == textColor)
      outputVideoStream(pixel) = inputVideoStream(pixel);
    else {
      outputVideoStream(pixel) *= transparency;
      outputVideoStream(pixel) += overlayColor * (1 − transparency);
    }
  }
}
semitransparentOverlayTransfer(inputVideoStream, overlayRegion, transparency,
messageType) {
  // inputVideoStream is the received video stream
  // overlayRegion identifies the region defined by the template that was detected
  /// transparency is a value between 0 and 1, indicating the degree of
  // transparency of the semitransparent overlay (0 indicating full opacity and
  // 1 full transparency) to use in the output. The transparency may be, but
  // need not be, the same as that used by the intermediate device
  // prior to invocation of this method, outputVideoStream contains
  // replacement content, without the semi-transparent overlay
  // identify the color of the semi-transparent overlay as the average color of
  // the overlay region (e.g., random un-modified pixels should average to a
  // neutral gray, such as RGB (128, 128, 128), pixels modified by a semi-
  // transparent overlay should average to the color of the overlay)
  // Alternatively, the overlayColor may be included as data for the template rather
  // than calculated from the inputVideoStream
  // messageType indicates an information type of text to be displayed
  // E.g., MESSAGE_TIME = current time,
  // MESSAGE_CHANNEL = current channel
  overlayColor = average(pixels in overlay region);
  for (each pixel in the overlay region) {
    // apply the overlay color to the region
    outputVideoStream(pixel) *= transparency;
    outputVideoStream(pixel) += overlayColor * (1 − transparency);
  }
  // set message to a string containing the appropriate information
  message = getMessage(messageType);
  // add the text of the message to the screen, for viewing by the user
  printMessage(message, overlayRegion);
}
```

Figure 13:
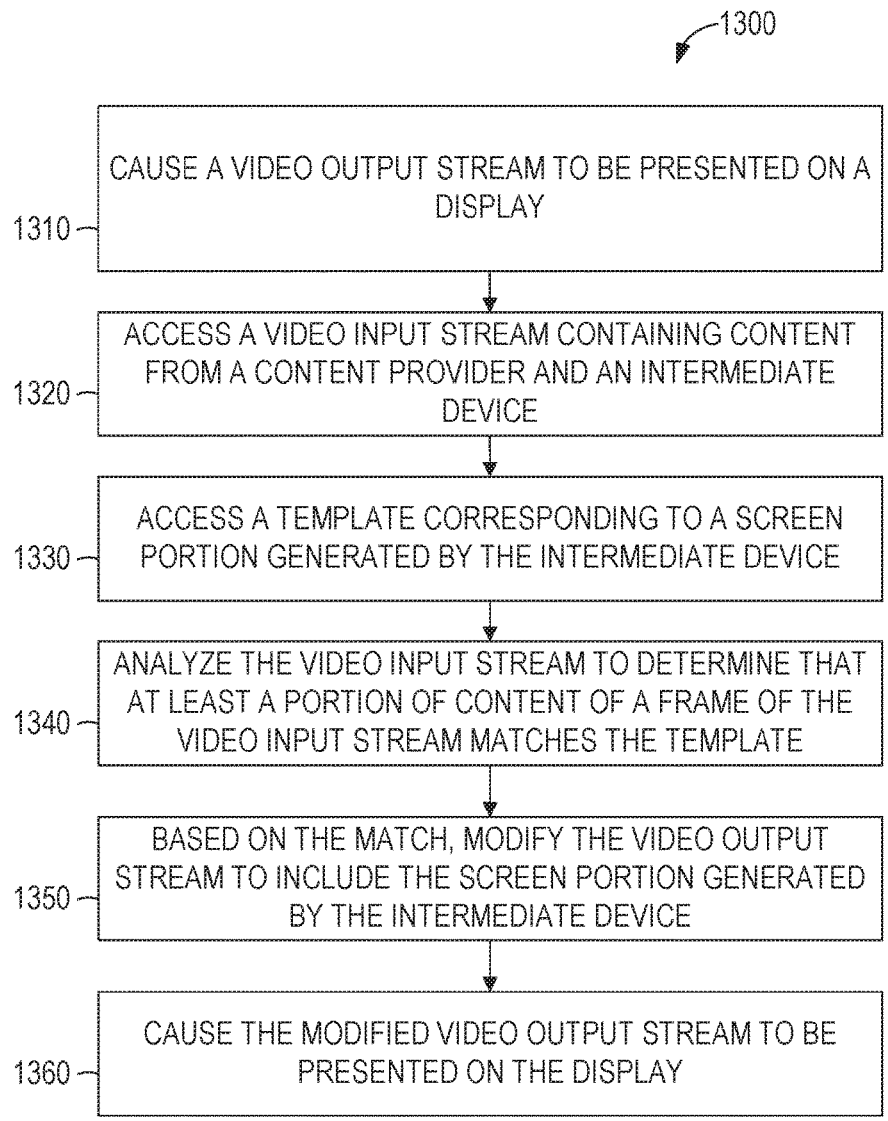
FIG. 13 is a flowchart illustrating a method, in some example embodiments, for dynamically providing a video overlay.

FIG. 13 is a flowchart illustrating a method 1300, in some example embodiments, for dynamically providing a video overlay. The method 1300 includes operations 1310-1360. By way of example and not limitation, the operations 1310-1360 are described as being performed by the modules of 210-250 of FIG. 2 and the modules 310-350 of FIG. 3.

In operation 1310, the client device 150 causes a video output stream to be presented on a display. For example, the query fingerprint generator 160 may have generated a query fingerprint from a video input stream received from the set-top box 140. Based on a generated query fingerprint, replacement video content may have been received from the replacement content server 180 and presented on a display of the client device 150 as a video output stream.

The client device 150, in operation 1320, accesses a video input stream containing content from a content provider and an intermediate device. For example, the video input stream may include content from the content source 110 that has been modified to include additional content from the set-top box 140.

In operation 1330, the client device 150 accesses a template corresponding to a screen portion generated by the intermediate device. For example, the video overlay module 330 may access a record in the database schema of FIG. 16 that contains data for the device identifier of the set-top box 140.

The video overlay module 330, in operation 1340, analyzes the video input stream to determine that at least a portion of content of a frame of the video input stream matches the template. In some example embodiments, multiple such templates are iterated over to determine if any of the templates for the intermediate device correspond to the content of a frame of the video input stream received from the intermediate device. The template may correspond to an icon (e.g., a phone icon or a mail icon) added to the video input stream by the intermediate device, predetermined text (e.g., "phone" or "mail") added to the video input stream by the intermediate device, a window in a particular location added to the video input stream by the intermediate device, or any suitable combination thereof.

The pseudocode method below is representative of some example embodiments:

```
findMatchingTemplate(inputVideoStream, deviceId) {
   // inputVideoStream is the received video stream
   // device Id is the identifier of the intermediate device
   matchingTemplate = NULL;
   // matchingTemplate will store the identified match, or NULL if none
   while (matchingTemplate == NULL &&
   template=getNextTemplate(deviceId))
   {
      // iterate over all of the templates for the intermediate device
      // until we have looked at them all or we have found a match
      // bitwise-AND the current frame of the inputVideoStream with
      // the bitmap of the template. This will zero out the portions of the
      // frame that are not used in determining if this template matches
      frame = inputVideoStream.currentFrame( ) & template.bitmap;
      // determine the difference between the frame and the template
      // this may be the sum of the absolute values of the distance in RGB
      // space for each compared pixel
      delta = compareImage(frame, image);
      // if the template matches the frame, this is the matching template
      if (delta < TEMPLATE_MATCH_THRESHOLD)
         matchingTemplate = template;
   }
}
```

The video overlay module 330, in operation 1350, modifies the video output stream to include the screen portion generated by the intermediate device, based on the match between the template and the at least a portion of content of the frame of the video input stream. For example, if the set-top box 140 is adding a notification message to the content received from the content source 110, one or more frames of the video input stream will match a template for the notification. The video overlay module 330 identifies the portion of the frames of the video input stream that contain the notification and copies the notification to the video output stream. In some example embodiments, copying the notification comprises copying each pixel of the video input stream in the notification area, as identified by the template, to the corresponding pixel of the video output stream. In other example embodiments, copying the notification comprises determining the contents of the notification (e.g., through OCR or image recognition) and regenerating the contents in the video output stream. In this way, a notification from the set-top box 140 is presented to a viewer of the client device 150 while the replacement content from the replacement content server 180 is being displayed. In operation 1360, the video overlay module 330 causes the modified video output stream to be presented on a display (e.g., a display of the client device 150).

In some example embodiments, modification of the video output stream ceases when the video input stream no longer matches the template. In other example embodiments, modification of the video output stream ceases when the video input stream matches a second template associated with the end of the modification. For example, a notification from the set-top box 140 may have a signature frame in an animation of a closing of the notification that can be matched by a second template. Accordingly, when the second template is matched, the video output stream is no longer modified to include the notification.

Figure 14:
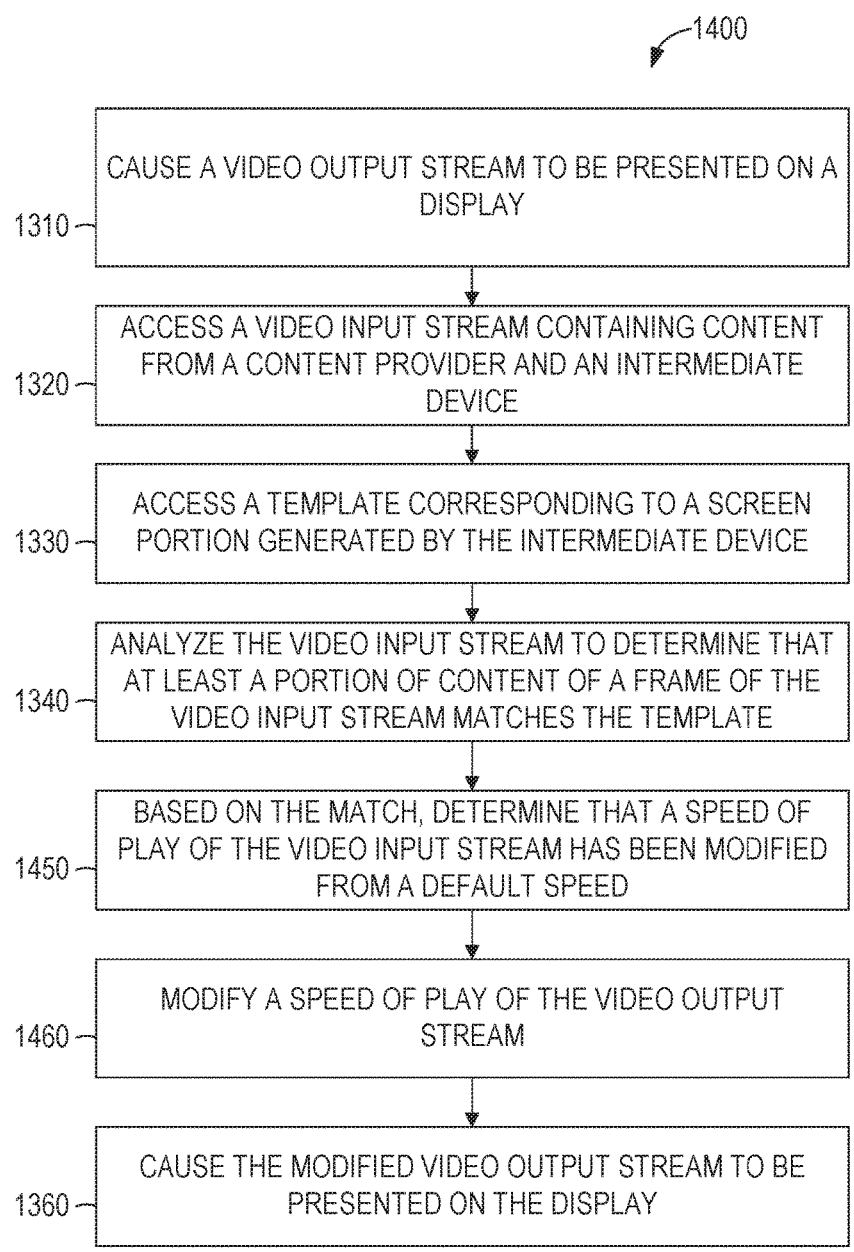
FIG. 14 is a flowchart illustrating a method, in some example embodiments, for dynamically providing a video overlay.

FIG. 14 is a flowchart illustrating a method, in some example embodiments, for dynamically providing a video overlay. The method 1400 includes operations 1310-1340, 1360, and 1450-1460. Operations 1310-1340 and 1360 are described above, with respect to FIG. 13. By way of example and not limitation, the operations 1450-1460 are described as being performed by modules of 210-250 of FIG. 2 and the modules 310-350 of FIG. 3.

In operation 1450, the video overlay module 330 determines, based on the match, that a speed of play of the video input stream has been modified from a default speed. For example, the template may indicate a double-triangle pointing right in a particular portion of the video input stream. Based on this double-triangle being present (as determined by the match between the video input stream and the template), the video overlay module 330 determines that playback speed has been increased. Similarly, the template may indicate a double-triangle pointing left or a pause symbol, and the video overlay module 330 could determine that playback speed of the video input stream has been reversed or paused.

In some example embodiments, the template also indicates the rate of playback. For example, an "×2" or "×4" may be present, indicating that the playback speed is doubled or quadrupled. As another example, two triangles may indicate double speed, three triangles may indicate quadruple speed, and so on. The particular meaning for a particular template may depend on a set-top box 140 identified by the set-top box identifier module 310.

In other example embodiments, the template does not indicate the rate of playback. The rate of playback may be determined by comparing fingerprints of successive frames of the video input stream with fingerprints of successive frames of a reference stream. If the fingerprints of the successive frames of the video input stream match every other fingerprint of the reference stream, playback is occurring at double speed. If the fingerprints are in reverse order, playback is occurring in reverse. If the fingerprints of the successive frames of the video input stream are doubled, playback is occurring at half speed.

The video overlay module 330 modifies a speed of play of the video output stream in operation 1460. In some example embodiments, the speed of play of the video output stream is modified to match the speed of play of the video input stream. Thus, if the speed of the video input stream is doubled relative to the default speed, the speed of the video output stream is also doubled.

The various methods disclosed herein may be combined. For example, combining the method 1300 with the method 1400 results in a video output stream that has a modified speed when the video input stream has a modified stream, wherein the video output stream also includes the screen portion generated by the intermediate device e.g., a fast-forward indicator).

Figure 15:
FIG. 15 is a flowchart illustrating a method, in some example embodiments, for dynamically providing a video overlay.

FIG. 15 is a flowchart illustrating a method, in some example embodiments, for dynamically providing a video overlay. The method 1500 includes operations 1510-1590. By way of example and not limitation, the operations 1510-1590 are described as being performed by the modules of 210-250 of FIG. 2 and the modules 310-350 of FIG. 3.

Figure 17:
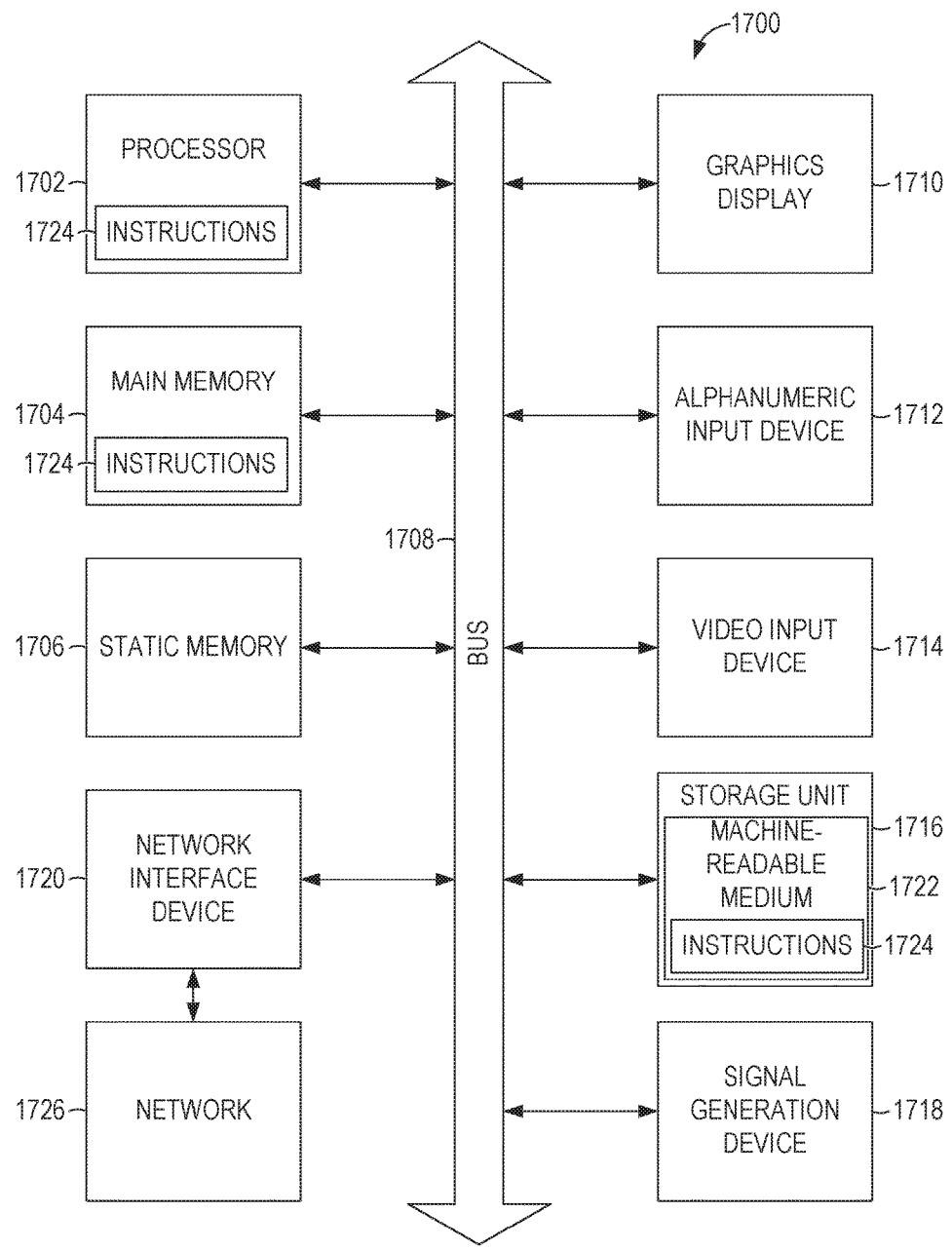
FIG. 17 is a block diagram illustrating components of a machine, according to some example embodiments, able to read instructions from a machine-readable medium and perform any one or more of the methodologies discussed herein.

In operation 1510, the client device 150 accesses a video input stream containing content from a content provider. For example, the video input device 1714 (as shown in FIG. 17) of the client device 150 may be connected to a video output of the set-top box 140. A video input stream may be sent from the set-top box 140 to the client device 150. The video input stream may include content from the content source 110 and content generated by the set-top box 140. For example, the set-top box 140 may provide an informational overlay superimposed on part of a video stream received from the content source 110.

In operation 1520, the client device 150 selects a video output stream based on content of the video input stream. For example, the query fingerprint generator 160 may generate a query fingerprint based on at least a portion of one or more frames of the video input stream. Based on the fingerprint, replacement video content is selected (e.g., through a database lookup, through communication with the replacement content server 180, or both) for use as a video output stream.

In operation 1530, the client device 150 causes the selected video output stream to be presented on a display. For example, the video output stream may be presented on a display of the client device 150. Alternatively, the video output stream may be sent by a video output of the client device 150 to a separate display device.

The video source identifier module 320, in operation 1540, determines that a change in the video input stream indicates a change in the content provider of the video input stream. For example, the query fingerprint generator 160 may have access to a series of fingerprints that match the original content of the video input stream. When the fingerprints generated by the query fingerprint generator 160 cease to match the series of fingerprints for the original content, a determination may be made that the content of the video input stream has changed, which may indicate that the content provider of the video input stream has also changed. For example, a user of the intermediate device may have changed channels or changed inputs (e.g., from a cable TV source to a broadcast TV source). In either case, the content provider has changed.

In response to the determination that the content provider of the video input stream has changed, the client device 150 causes the video input stream to be presented on the display (operation 1550). Thus, the replacement video output stream is presented as a replacement for the original video input stream accessed in operation 1510, but not for the changed video input stream detected in operation 1540.

In operation 1560, the client device 150 accesses a template corresponding to a screen portion generated by the intermediate device. For example, the video overlay module 330 may access a record in the database schema of FIG. 16 that contains data for the device identifier of the set-top box 140.

The video overlay module 330, in operation 1570, analyzes the video input stream to determine that at least a portion of content of a frame of the video input stream matches the template. In some example embodiments, multiple such templates are iterated over to determine if any of the templates for the intermediate device correspond to the content of a frame of the video input stream received from the intermediate device. The template may correspond to an icon (e.g., a cable icon or a TV icon) added to the video input stream by the intermediate device, predetermined text (e.g., a number or alphanumeric sequence indicating a channel) added to the video input stream by the intermediate device, a window in a particular location added to the video input stream by the intermediate device, or any suitable combination thereof.

In operations 1580 and 1590, based on the match, the client device 150 determines that a second change in the video input stream indicates a return to the first content provider and, responsive to the determination, causes the presentation of the video output stream to resume. For example, if the original video input stream included content from channel 15, which was identified as matching content to be replaced, then replacement video content was presented in operation 1530. After a change of channel, presentation of the replacement video content ceased in operation 1550. After detection of a return to the original channel (e.g., by matching a template for an overlay provided by the intermediate device that indicates that the current channel is 15), presentation of the replacement video content in the video output stream resumes (operation 1590). Thus, by use of the method 1500, replacement content for one content provider can be provided while allowing the user to view the content for other providers and without being disrupted by switching away from and returning to the content provider being replaced.

In some example embodiments, the video output stream is modified to include a portion of the video input stream that matches the template. For example, if a template of the topological form of FIG. 6 is matched, with a region 610 including channel information generated by the set-top box 140, then the region 610 can be copied from the video input stream to the video output stream, allowing the information generated by the intermediate device to be presented while the video output stream is presented.

Figure 16:
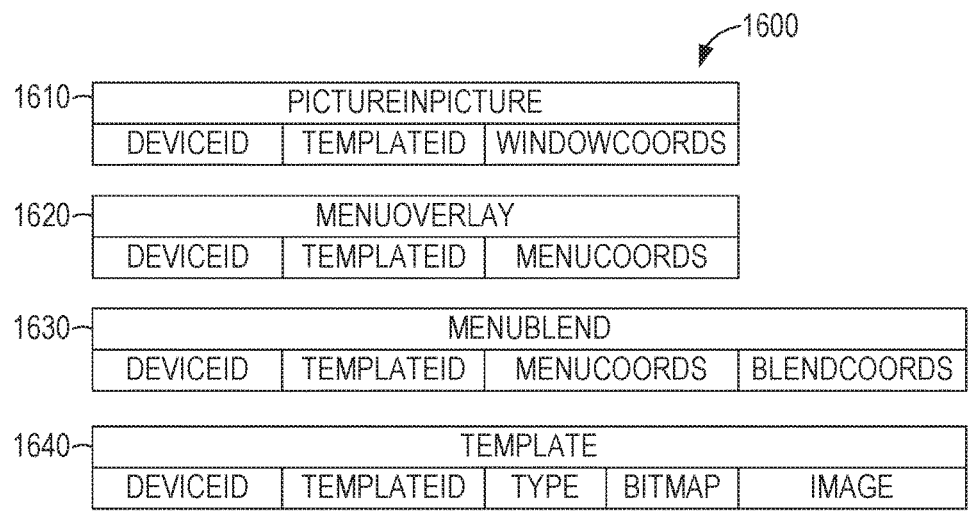
FIG. 16 is a block diagram illustrating data structures, in example embodiments, for dynamically providing a video overlay.

FIG. 16 is a block diagram 1600 illustrating data structures, in example embodiments, for dynamically providing a video overlay. FIG. 16 shows a PictureInPicture table 1610, a MenuOverlay table 1620, a MenuBlend table 1630, and a Template table 1640.

The PictureInPicture table 1610 includes fields for a device identifier (DeviceID), a template identifier (TemplateID), and window coordinates (WindowCoords). In some example embodiments, the PictureInPicture table 1610 contains one row for each picture-in-picture template for each set-top box. Thus, once a particular set-top box is identified by its DeviceID and a particular template is identified by its TemplateID, the coordinates for the position and size of the picture-in-picture display of the replacement content can be retrieved. The PictureInPicture table 1610 may be used to support templates topologically similar to the template of FIG. 4.

The MenuOverlay table 1620 includes fields for a device identifier, a template identifier, and menu coordinates (MenuCoords). In some example embodiments, the MenuOverlay table 1620 contains one row for each menu overlay template for each set-top box. Thus, once a particular set-top box is identified by its DeviceID and a particular template is identified by its TemplateID, the coordinates for the position and size of the portion of the video occupied by a menu overlay can be determined from the MenuCoords. The MenuOverlay table 1620 may be used to support templates topologically similar to the template of FIGS. 5 and 6.

The MenuBlend table 1630 includes fields for a device identifier, a template identifier, menu coordinates, and blend coordinates (BlendCoords). In some example embodiments, the MenuBlend table 1630 contains one row for each menu blend template for each set-top box. Thus, once a particular set-top box is identified by its DeviceID and a particular template is identified by its TemplateID, the coordinates for the position and size of the portion of the video occupied by a menu overlay can be determined from the MenuCoords, and the coordinates for the position and size of the portion of the screen to be generated by blending the replacement video with the video from the set-top box can be determined from the BlendCoords. The MenuBlend table 1630 may be used to support templates topologically similar to the template of FIG. 7. In some example embodiments, the MenuOverlay table 1620 is subsumed into the MenuBlend table 1630, since when the BlendCoords define a region of zero area, the MenuBlend table 1630 may be used to support templates topologically similar to the templates of FIGS. 5 and 6.

The Template table 1640 includes fields for a device identifier, a template identifier, a type, a bitmap, and an image. The bitmap is the same size as the image and a frame of the video input stream. Each value in the bitmap indicates whether the corresponding pixel in the image and the video input stream is to be used to determine if the template matches the video input stream. The portions of the image corresponding to the "1" values of the bitmap are to be compared to the video input stream. The portions of the image corresponding to the "0" values of the bitmap are black. The type indicates the type of the template, for use once a match is found. For example, a type of PICTUREINPICTURE indicates that the template is for a picture-in-picture display, and that the window coordinates for the embedded picture may be retrieved from the PictureInPicture table 1610.

According to various example embodiments, one or more of the methodologies described herein may facilitate dynamic video overlays. Moreover, one or more of the methodologies described herein may reduce computation time on a client device performing methods of providing dynamic video overlays, transmission time between a client device and a server, memory storage requirements on a server performing methods of dynamic video overlays, and computation time on a server performing methods of dynamic video overlays.

When these effects are considered in aggregate, one or more of the methodologies described herein may obviate a need for certain efforts or resources that otherwise would be involved in dynamic video overlays. Efforts expended by a user in dynamic video overlays may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

FIG. 17 is a block diagram illustrating components of a machine 1700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 17 shows a diagrammatic representation of the machine 1700 in the example form of a computer system and within which instructions 1724 (e.g., software, a program, an application, an applet, an app, or other executable code) for causing the machine 1700 to perform any one or more of the methodologies discussed herein may be executed, in whole or in part. In alternative embodiments, the machine 1700 operates as a standalone device or may be connected (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a PC, a tablet computer, a laptop computer, a netbook, a set-top box, a smart TV, a personal digital assistant (PDA), a cellular telephone, a smartphone, a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include a collection of machines that individually or jointly execute the instructions 1724 to perform all or part of any one or more of the methodologies discussed herein.

The machine 1700 includes a processor 1702 (e.g., a central processing unit (CPU), a graphics processing unit (GPU), a digital signal processor (DSP), an ASIC, a radio-frequency integrated circuit (RFIC), or any suitable combination thereof), a main memory 1704, and a static memory 1706, which are configured to communicate with each other via a bus 1708. The machine 1700 may further include a graphics display 1710 (e.g., a plasma display panel (PDP), an LED display, an LCD, a projector, or a CRT). The machine 1700 may also include an alphanumeric input device 1712 (e.g., a keyboard), a video input device 1714 (e.g., a component video input, a composite video input, or a high-definition multimedia interface (HDMI)), a storage unit 1716, a signal generation device 1718 (e.g., a speaker), and a network interface device 1720.

The storage unit 1716 includes a machine-readable medium 1722 on which are stored the instructions 1724 embodying any one or more of the methodologies or functions described herein. The instructions 1724 may also reside, completely or at least partially, within the main memory 1704, within the processor 1702 (e.g., within the processor's cache memory), or both, during execution thereof by the machine 1700. Accordingly, the main memory 1704 and the processor 1702 may be considered as machine-readable media. The instructions 1724 may be transmitted or received over a network 1726 (e.g., network 170 of FIG. 1) via the network interface device 1720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1700), such that the instructions, when executed by one or more processors of the machine (e.g., processor 1702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. "Non-transitory machine-readable media" refers to all machine-readable media except for transitory signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for dynamically providing a video overlay, the method comprising:
    accessing, by one or more processors, a video input stream that includes first video content from a first content provider;
    based on the first video content of the video input stream, selecting replacement video content for a video output stream, wherein the replacement video content of the video output stream is different from the first video content of the video input stream, wherein the replacement video content is selected in response to a video identification system receiving a query fingerprint from a query fingerprint generator of a client device and the video identification system identifying a match between the query fingerprint and at least one reference fingerprint generated by a reference fingerprint generator, wherein the query fingerprint is generated based on a frame of the first video content, and wherein the video identification system and the reference fingerprint generator are remote from the client device;
    causing the replacement video content of the video output stream to be presented on a display of the client device;
    while the display is presenting the replacement video content of the video output stream, determining, by the one or more processors, that a first change in the video input stream has occurred, wherein the first change indicates a change from the first content provider to a second content provider of the video input stream has occurred, wherein the video input stream includes second video content from the second content provider after the first change has occurred;
    in response to determining the change from the first content provider to the second content provider has occurred, causing the second video content of the video input stream to be presented on the display instead of the replacement video content;
    after causing the second video content of the video input stream to be presented on the display:
    accessing, from a database, a template corresponding to a screen portion of the display for third video content generated by an intermediate device;
    analyzing, by the one or more processors, the video input stream to determine that at least a portion of the third video content of a frame of the video input stream matches the template when the video input stream includes the first video content from the first content provider and the third video content generated by the intermediate device, wherein the third video content is configured to be presented on the display to indicate an identity of the first content provider;
    based on the at least the portion of the third video content of the frame of the video input stream matching the template, determining that a second change in the video input stream indicates a return to the first content provider of the video input stream; and
    in response to the determination that the first content provider of the video input stream has been returned to:
    modifying the video output stream to include the replacement video content and the third video content, and
    causing a presentation of the replacement video content and the third video content of the modified video output stream on the display, wherein the third video content is presented as the video overlay on the replacement video content.

2. The method of claim 1, wherein:
    the selecting of the video output stream comprises sending to a replacement video content server a request, which includes an indication of the first video content to be replaced.

3. The method of claim 2, wherein the sending of the request comprises:
    generating, by the one or more processors, a fingerprint of the video input stream; and
    comparing the fingerprint of the video input stream to a fingerprint of content to be replaced.

4. The method of claim 2, wherein the video input stream is received via a first communication network and the replacement video content is received via a second communication network.

5. The method of claim 1, wherein the determining that the change in the video input stream indicates the change from the first content provider to the second content provider of the video input stream comprises:
    generating a sequence of fingerprints from the video input stream; and
    comparing successive fingerprints of the sequence of fingerprints to successive fingerprints of content to be replaced.

6. The method of claim 1, wherein the first content provider is a cable television station.

7. The method of claim 1, wherein the analyzing of the video input stream to determine that at least the portion of the third video content of the frame of the video input stream matches the template comprises:
   downsampling the frame of the video input stream;
   determining a cross-correlation between the downsampled frame and the template; and
   comparing the cross-correlation to a threshold.

8. The method of claim 1, wherein the intermediate device is a set-top box,
   wherein accessing the video input stream comprises receiving, by one or more processors, the video input stream from the set-top box, and
   wherein the third video content is configured to be presented on the display to indicate the identity of the first content provider responsive to a change in the video input stream from the second content provider to the first content provider.

9. The method of claim 1, wherein when the video input stream includes the first video content from the first content provider and the third video content generated by the intermediate device, the first video content is configured to be presented in a first screen portion of the display and the third video content is configured to be presented in a second screen portion of the display, and
   wherein modifying the video output stream to include the replacement video content and the third video content comprising modifying the video output stream to include the replacement video content in first screen portion of the display and the third video content in the second screen portion of the display.

10. A system for dynamically providing a video overlay, the system comprising:
    a memory that stores instructions; and
    one or more processors configured by the instructions to perform operations comprising:
    accessing a video input stream that includes first video content from a first content provider;
    based on the first video content of the video input stream, selecting replacement video content for a video output stream, wherein the replacement video content of the video output stream is different from the first video content of the video input stream, wherein the replacement video content is selected in response to a video identification system receiving a query fingerprint from a query fingerprint generator of a client device and the video identification system identifying a match between the query fingerprint and at least one reference fingerprint generated by a reference fingerprint generator, wherein the query fingerprint is generated based on a frame of the first video content, and wherein the video identification system and the reference fingerprint generator are remote from the client device;
    causing the replacement video content of the video output stream to be presented on a display of the client device;
    while the display is presenting the replacement video content of the video output stream, determining, by the one or more processors, that a first change in the video input stream has occurred, wherein the first change indicates a change from the first content provider to a second content provider of the video input stream has occurred, wherein the video input stream includes second video content from the second content provider after the first change has occurred;
    in response to determining the change from the first content provider to the second content provider has occurred, causing the second video content of the video input stream to be presented on the display instead of the replacement video content;
    after causing the second video content of the video input stream to be presented on the display:
    accessing, from a database, a template corresponding to a screen portion of the display for third video content generated by an intermediate device;
    analyzing the video input stream to determine that at least a portion of the third video content of a frame of the video input stream matches the template when the video input stream includes the first video content from the first content provider and the third video content generated by the intermediate device, wherein the third video content is configured to be presented on the display to indicate an identity of the first content provider;
    based on the at least the portion of the third video content of the frame of the video input stream matching the template, determining that a second change in the video input stream indicates a return to the first content provider of the video input stream; and
    in response to the determination that the first content provider of the video input stream has been returned to:
    modifying the video output stream to include the replacement video content and the third video content, and
    causing a presentation of the replacement video content and the third video content of the modified video output stream on the display, wherein the third video content is presented as the video overlay on the replacement video content.

11. The system of claim 10, wherein:
    the selecting of the video output stream comprises sending to a replacement content server a request, which includes an indication of the first video content to be replaced.

12. The system of claim 11, wherein the sending of the request comprises:
    generating a fingerprint of the video input stream; and
    comparing the fingerprint of the video input stream to a fingerprint of content to be replaced.

13. The system of claim 11, wherein the video input stream is received via a first communication network and the replacement video content is received via a second communication network.

14. The system of claim 10, wherein the determining that the change in the video input stream indicates the change from the first content provider to the second content provider of the video input stream comprises:
    generating a sequence of fingerprints from the video input stream; and
    comparing successive fingerprints of the sequence of fingerprints to successive fingerprints of content to be replaced.

15. The system of claim 10, wherein the first content provider is a cable television station.

16. The system of claim 10, wherein the analyzing of the video input stream to determine that at least the portion of the third video content of the frame of the video input stream matches the template comprises:
    downsampling the frame of the video input stream;
    determining a cross-correlation between the downsampled frame and the template; and
    comparing the cross-correlation to a threshold.

17. A non-transitory machine-readable medium that stores instructions that, when executed by one or more processors, cause the one or more processors to perform operations comprising:
- accessing a video input stream that includes first video content from a first content provider;
- based on the first video content of the video input stream, selecting replacement video content for a video output stream, wherein the replacement video content of the video output stream is different from the first video content of the video input stream, wherein the replacement video content is selected in response to a video identification system receiving a query fingerprint from a query fingerprint generator of a client device and the video identification system identifying a match between the query fingerprint and at least one reference fingerprint generated by a reference fingerprint generator, wherein the query fingerprint is generated based on a frame of the first video content, and wherein the video identification system and the reference fingerprint generator are remote from the client device;
- causing the replacement video content of the video output stream to be presented on a display of the client device;
- while the display is presenting the replacement video content of the video output stream, determining, by the one or more processors, that a first change in the video input stream has occurred, wherein the first change indicates a change from the first content provider to a second content provider of the video input stream has occurred, wherein the video input stream includes second video content from the second content provider after the first change has occurred;
- in response to determining the first change from the first content provider to the second content provider has occurred, causing the second video content of the video input stream to be presented on the display instead of the replacement video content;
- after causing the second video content of the video input stream to be presented on the display:
- accessing, from a database, a template corresponding to a screen portion of the display for third video content generated by an intermediate device;
- analyzing the video input stream to determine that at least a portion of the third video content of a frame of the video input stream matches the template when the video input stream includes the first video content from the first content provider and the third video content generated by the intermediate device, wherein the third video content is configured to be presented on the display to indicate an identity of the first content provider;
- based on the at least the portion of the third video content of the frame of the video input stream matching the template, determining that a second change in the video input stream indicates a return to the first content provider of the video input stream; and
- in response to the determination that the first content provider of the video input stream has been returned to:
- modifying the video output stream to include the replacement video content and the third video content, and
- causing a presentation of the replacement video content and the third video content of the modified video output stream on the display, wherein the third video content is presented as a video overlay on the replacement video content.

18. The non-transitory machine-readable medium of claim 17, wherein:
- the selecting of the video output stream comprises sending to a replacement content server a request, which includes an indication of the first video content to be replaced.

19. The non-transitory machine-readable medium of claim 18, wherein the sending of the request comprises:
- generating a fingerprint of the video input stream; and
- comparing the fingerprint of the video input stream to a fingerprint of content to be replaced.

20. The non-transitory machine-readable medium of claim 17, wherein the determining that the change in the video input stream indicates the change from the first content provider to the second content provider of the video input stream comprises:
- generating a sequence of fingerprints from the video input stream; and
- comparing successive fingerprints of the sequence of fingerprints to successive fingerprints of content to be replaced.

* * * * *